United States Patent
Faccin

(10) Patent No.: US 8,662,594 B2
(45) Date of Patent: Mar. 4, 2014

(54) ARM-REST ADJUSTABLE IN INCLINATION, IN PARTICULAR FOR VEHICLES

(75) Inventor: Francesco Faccin, Chiuppano (IT)

(73) Assignee: Clerprem S.p.A., Carrè, Vicenza (IT)

( * ) Notice: Subject to any disclaimer, the term of this patent is extended or adjusted under 35 U.S.C. 154(b) by 314 days.

(21) Appl. No.: 13/060,635

(22) PCT Filed: Aug. 6, 2009

(86) PCT No.: PCT/IB2009/053443
§ 371 (c)(1),
(2), (4) Date: Mar. 10, 2011

(87) PCT Pub. No.: WO2010/020899
PCT Pub. Date: Feb. 25, 2010

(65) Prior Publication Data
US 2011/0187175 A1    Aug. 4, 2011

(30) Foreign Application Priority Data
Aug. 20, 2008 (IT) .............................. PD2008A0253

(51) Int. Cl.
*B60N 2/46* (2006.01)

(52) U.S. Cl.
USPC ..................... 297/411.38; 296/1.09; 248/118

(58) Field of Classification Search
USPC ......... 297/411.35, 411.38; 296/1.09; 248/118
See application file for complete search history.

(56) References Cited

U.S. PATENT DOCUMENTS

| | | | |
|---|---|---|---|
| 5,769,495 A | 6/1998 | Vairinen | |
| 6,578,922 B2 * | 6/2003 | Khedira et al. | 297/411.32 |
| 6,652,032 B2 * | 11/2003 | Laval | 297/411.32 |
| 6,916,068 B2 * | 7/2005 | Kitamura et al. | 297/411.3 |
| 2001/0020799 A1 * | 9/2001 | Bullesbach et al. | 297/411.38 |
| 2006/0138845 A1 * | 6/2006 | Omori | 297/411.38 |
| 2007/0241603 A1 * | 10/2007 | Otto | 297/411.38 |
| 2009/0309407 A1 * | 12/2009 | Saito et al. | 297/411.32 |
| 2010/0090485 A1 * | 4/2010 | Cho | 296/1.09 |
| 2010/0308636 A1 * | 12/2010 | Cebula et al. | 297/411.38 |

FOREIGN PATENT DOCUMENTS

| | | |
|---|---|---|
| DE | 10218568 | 11/2003 |
| DE | 10356293 | 6/2005 |
| DE | 102006014822 | 10/2007 |
| EP | 0751032 | 1/1997 |
| EP | 1132254 | 9/2001 |
| EP | 1491392 | 12/2004 |
| FR | 2788834 | 7/2000 |
| FR | 2858376 | 2/2005 |

* cited by examiner

*Primary Examiner* — David R Dunn
*Assistant Examiner* — Alexander Harrison
(74) *Attorney, Agent, or Firm* — Shoemaker and Mattare

(57) ABSTRACT

Arm-rest, adjustable in inclination, in particular for vehicles, comprising: —a fixed part 2, intended to be connected to the frame of the vehicle; —a movable part 3, hinged to the fixed part 2 around a rotation axis X by —hinging means 10, 43, 53 to move between a lowered angular position and a raised angular position; and —a system for adjusting the inclination of the movable part 3 between the aforesaid lowered position and the aforesaid raised position. The invention is characterized by the fact that the system for adjusting comprises at least one freewheeling bearing 20, chosen from the rolling-contact or cam type, associated to the hinging means 10, 43, 53 so as to allow the movable part 3 to rotate around the axis X only in the direction of rotation which from the lowered position leads to the raised position. The system for adjusting also comprises releasing means which act on the hinging means 10 and are able to liberate the rotation, of the movable part 3 from the raised position to the lowered position.

4 Claims, 16 Drawing Sheets

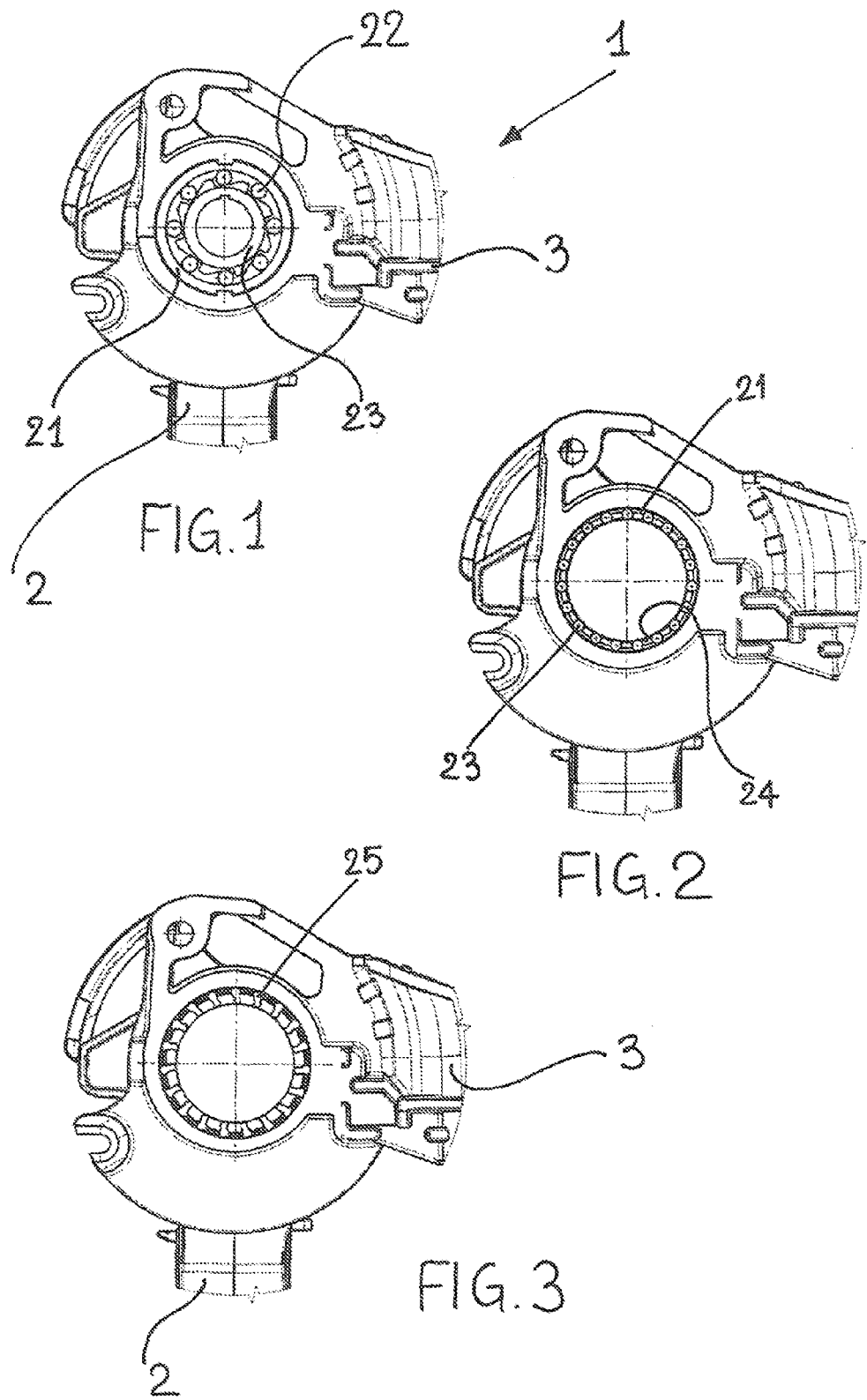

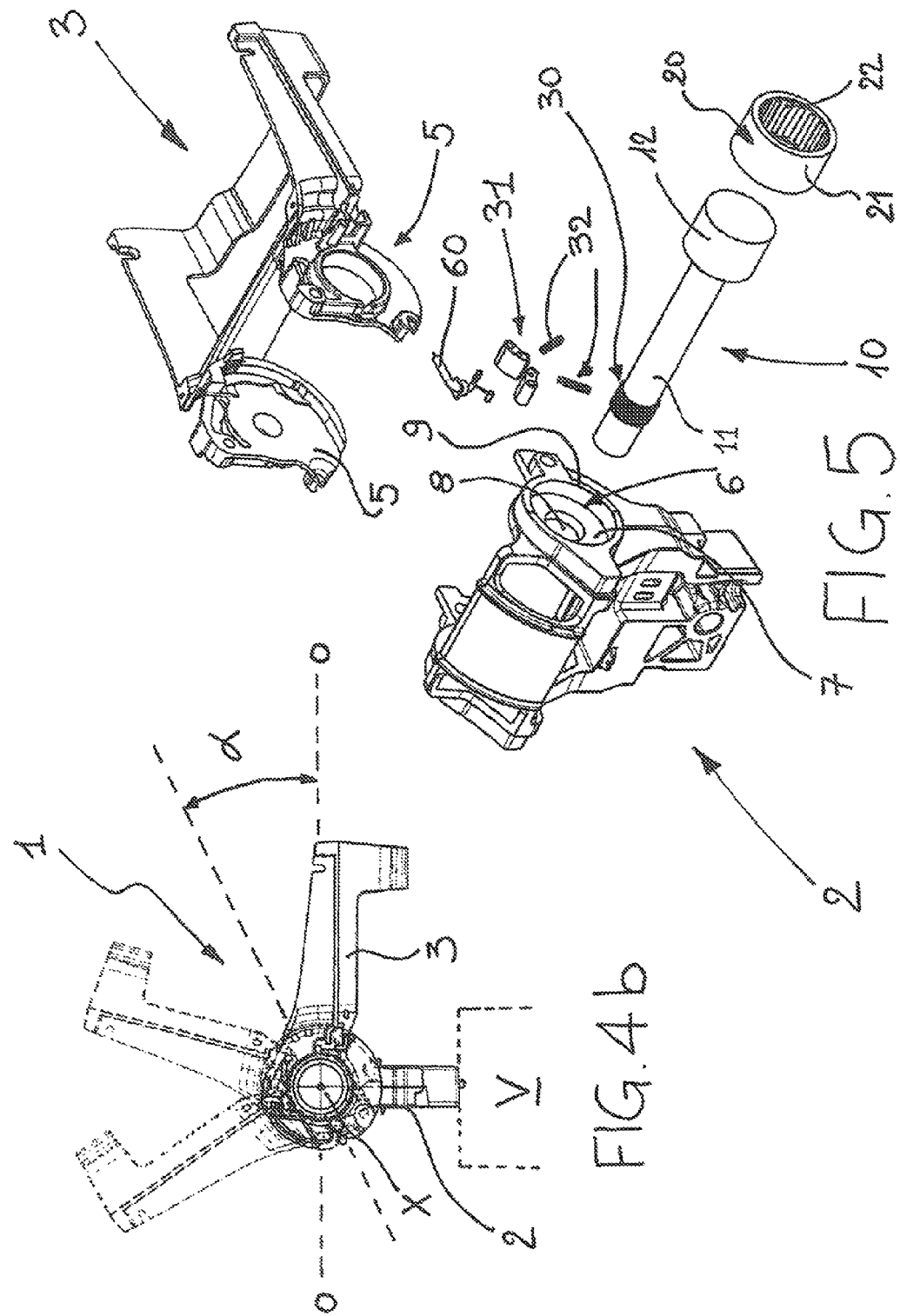

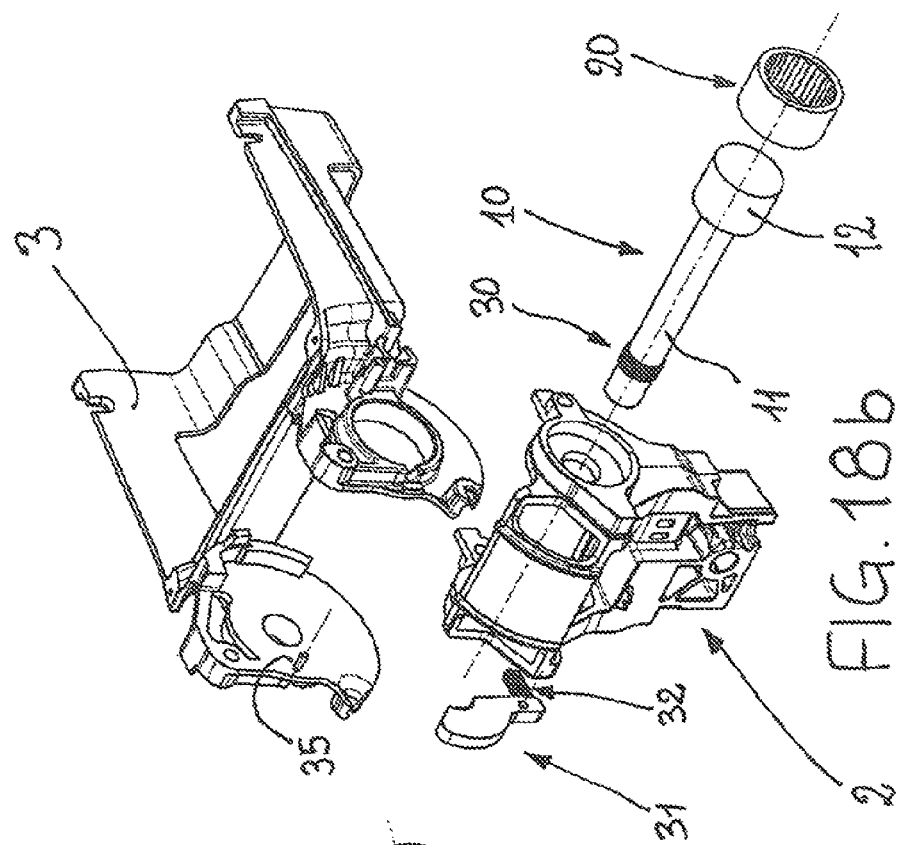
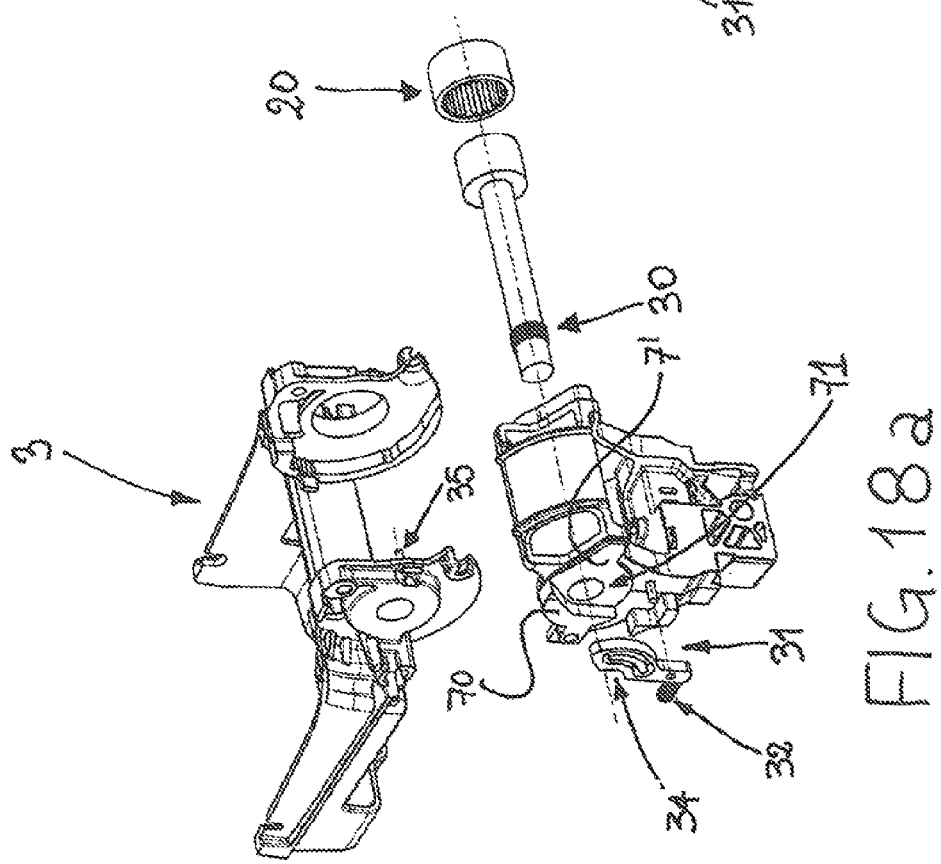

ARM-REST ADJUSTABLE IN INCLINATION, IN PARTICULAR FOR VEHICLES

FIELD OF APPLICATION

The present invention relates to an arm-rest adjustable in inclination, in particular for vehicles.

STATE OF THE ART

As is known many vehicles are provided with arm-rests adjustable in inclination.

An example of a traditional adjustable arm-rest is shown in FIGS. 32 and 33, which respectively show a perspective and front view of the load-bearing frame.

In general, an arm-rest adjustable in inclination is provided with a load-bearing frame comprising a fixed part F, which is attached to the vehicle, and a movable part M, which is hinged to the fixed part F along a rotation axis X and defines by means of upholstery (not shown in the figures) the plane of the arm-rest.

The inclination of the plane of the arm-rest is adjusted by rotating properly the movable part M in relation to the fixed part F, between a lowered position (as shown in FIG. 32), which generally corresponds with the movable part positioned horizontally, and a raised position (not shown), which generally corresponds with the movable part positioned vertically.

To such purpose, adjustable arm-rests traditionally have adjustment systems comprising a ratchet device. The latter is framed so as to allow the rotation of the movable part in steps upwards only and to keep the movable part in the position reached in the upward rotary movement.

More in detail, as one may observe in FIG. 34 (relative to a cross-section view along the plane C-C shown in the front view of FIG. 33), the ratchet device comprises a toothed portion D made on the movable part M and a pawl L, hinged to the fixed part and kept constantly engaged to the toothed portion D by an elastic element (not visible in FIGS. 32, 33 and 34). The pawl L may only disengage itself from the toothed portion D when the movable part M is rotated upwards.

During this movement, in fact, the movable part M itself contrasts the effect of the elastic element, disengaging the pawl L from the toothed wheel D.

The rotation downwards of the movable part M requires, on the contrary, that the ratchet device be deactivated.

To such purpose the system for adjusting the arm-rest comprises proper releasing means of the pawl (not shown in the attached figures), normally activable on command by the user by means of suitable leverisms.

A first limit of the adjustable arm-rests described above lies in the impossibility of fine adjustment of the inclination. The ratchet device enables adjustment (in steps) at predefined positions, the number of which is substantially equivalent to the number of teeth in the toothed portions. Once the excursion angle has been fixed (between the maximum and minimum inclination) for reasons of construction and solidity, it is not possible to increase the number of teeth. This significantly limits the adjustment possibilities, thereby making the arm-rest not always adaptable to the user's needs, to the detriment of perceived comfort.

A second limit is the noise of the system for adjusting the arm-rest. The steps of the ratchet device produce noises which may be annoying, giving the idea of malfunctioning and poor product quality.

A third limit is associated with the risk that the ratchet device, on account of wear or construction defects of the toothed portions, may not function correctly. It may happen in fact that in some adjustment positions, the movable part of the arm-rest does not remain stable, or that the movable part suddenly falls downwards. The blocking of the movable part on the fixed part is in fact entrusted to the engagement of toothed portions of limited extension.

SUMMARY OF THE INVENTION

Consequently, purpose of the present invention is to eliminate the drawbacks of the aforementioned known art, making available an adjustable arm-rest, in particular for vehicles, which permits a finer adjustment of the inclination of the support plane it defines.

A further purpose of the present invention is to make available an adjustable arm-rest, which permits silent adjustment of the inclination.

A further purpose of the present invention is to make available an adjustable arm-rest, which is structurally safe and solid.

A further purpose of the present invention is to make available an adjustable arm-rest, which is easy and economical to produce.

BRIEF DESCRIPTION OF THE DRAWINGS

The technical characteristics of the invention, in line with the aforesaid purposes, are clearly verifiable from the contents of the claims shown below and the advantages of the same will be more evident in the detailed description below, made with reference to the attached drawings, shown merely by way of example and not limited to such one embodiment, wherein:

FIGS. 1 to 3 show three different types freewheels;

FIG. 4b shows a lateral view of the arm-rest in FIG. 4a with the movable part represented in different adjustment positions;

FIG. 5 shows an exploded view of the adjustable arm-rest illustrated in FIG. 4a;

FIG. 16 shows a detail of the adjustable arm-rest illustrated in FIG. 12 relative to an annular body with cam;

FIGS. 18a and 18b show two exploded views of the adjustable arm-rest illustrated in FIG. 17 taken from two different angles;

DETAILED DESCRIPTION

Figure 4A:
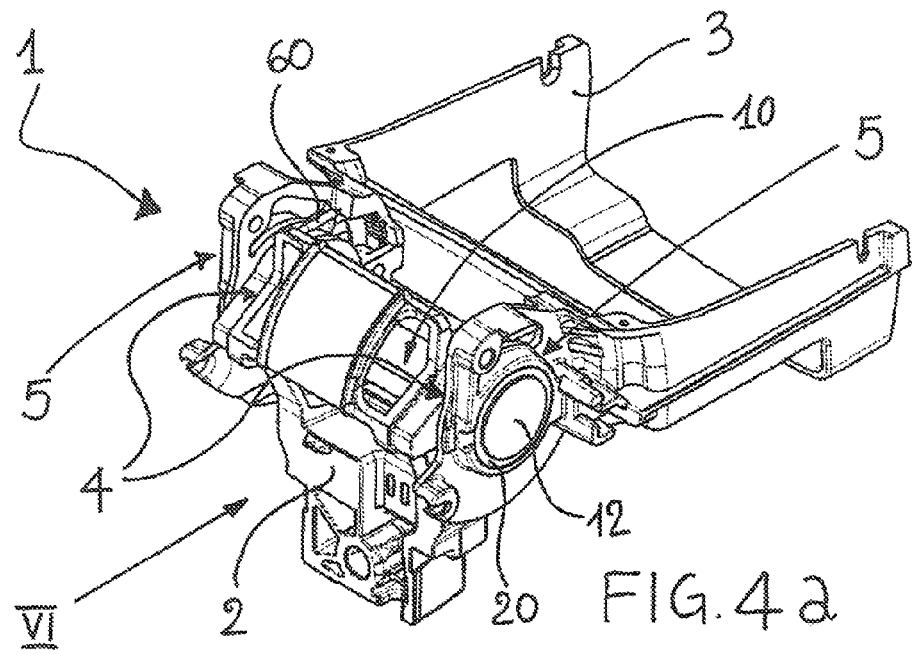
FIG. 4a shows a perspective view of an adjustable arm-rest made according to a first embodiment of the invention and represented with the movable part in the position of minimum inclination.
Figure 6:
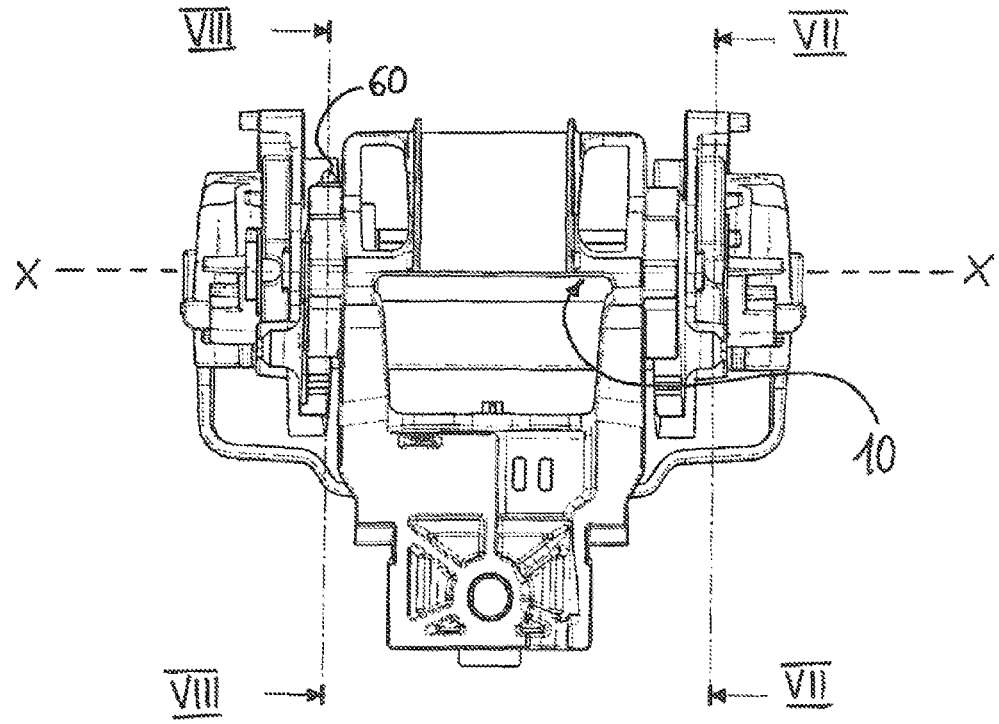
FIG. 6 shows a front view of the adjustable arm-rest illustrated in FIG. 4a according to the arrow VI shown therein.
Figure 7:
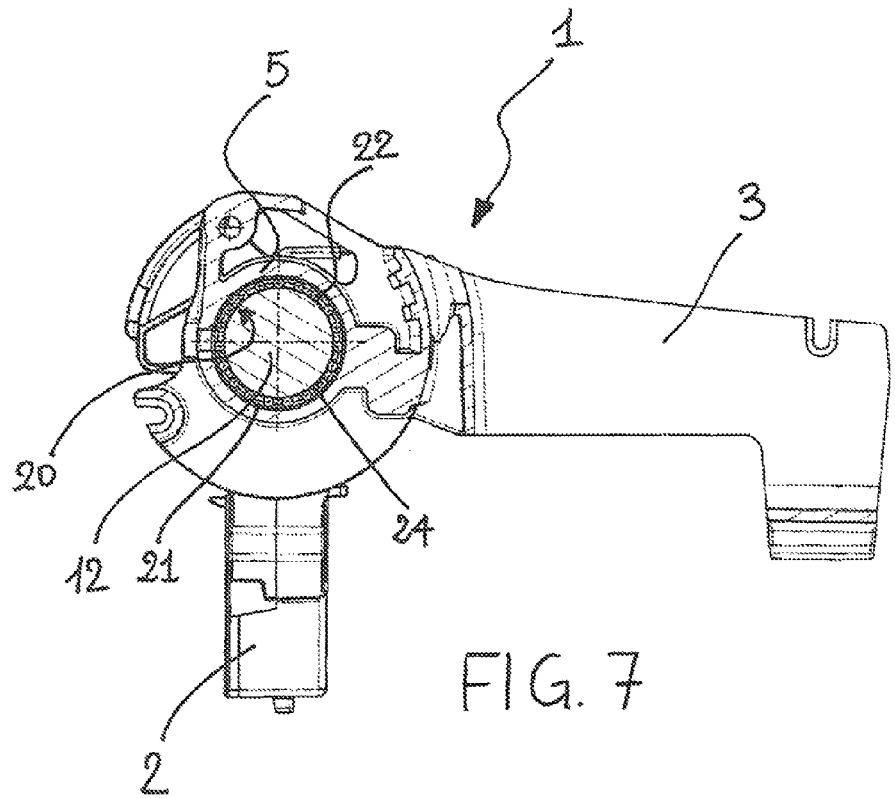
FIGS. 7 and 8 show two cross-section views of the adjustable arm-rest illustrated in FIG. 6 respectively according to the lines VII-VII and VIII-VIII shown therein.

With reference to the attached drawings reference numeral 1 globally denotes an arm-rest adjustable in inclination according to the invention.

The arm-rest according to the invention has been designed for installation in cars, in particular between the two front seats.

The arm-rest 1 may however be advantageously installed in other vehicles, such as vans and lorries. Applications in sectors other than the automotive sector are not excluded however, as for example in the furniture sector for the production of adjustable arm-rests for armchairs or chairs.

Hereinafter in the description, terms such as "horizontal" or "vertical" are used imagining the arm-rest 1 installed on a vehicle V (as schematically illustrated in FIG. 4b), and therefore taking as a spatial reference the floor of the vehicle itself.

Angle of inclination α is taken to mean the angle between the support plane defined by the arm-rest 1 and an substantially horizontal plane O.

According to a general embodiment of the invention, the adjustable arm-rest 1 comprises a fixed part 2, intended to be connected to the vehicle frame, and a movable part 3, hinged to the fixed part 2 around a rotation axis X by hinging means 10, 43, 53 to move between a lowered angular position and a raised angular position.

The fixed part 2 may be rigidly constrained to the vehicle frame, or can be connected to it in a sliding manner to enable the arm-rest to translate horizontally.

The movable part 3 defines the support plane of the arm-rest and to such purpose, is intended to support covering elements, such as upholstery. The movable part 3 may also be provided with an extension system in a horizontal direction.

In the lowered position and in the raised position the movable part 3 respectively defines the minimum and maximum angle of inclination of the arm-rest foreseen for normal use of the arm-rest as a support.

The angle of minimum inclination may be null (i.e. movable part 3 horizontal, as illustrated in FIG. 4b), positive (movable part 3 inclined upwards) or negative (movable part 3 inclined downwards).

It is not excluded that for functioning reasons, even independent of mere adjustment of the inclination, once the "raised position" or "lowered position" has been reached, the movable part 3 may be rotated further upwards or downwards.

The arm-rest 1 comprises a system for adjusting the inclination of the movable part 3 between the aforesaid lowered position and the aforesaid raised position.

According to the invention, the system for adjusting the inclination a comprises at least one freewheeling bearing 20 associated to the aforesaid hinging means 10, 43, 53 so as to allow the movable part 3 to rotate around the axis X only in the direction of rotation which from the lowered position leads to the raised position, that is only upwards. The freewheeling bearing is chosen either of the rolling-contact type or of the cam type.

Hereinafter for the sake of simplicity, the direction of rotation which from the lowered position leads to the raised position will be defined as upward rotation, while the direction of rotation which from the raised position leads to the lowered position will be defined as downward rotation.

"Freewheel" is taken to mean a coupling between two rotating bodies which permits the transmission of movement from one body to the other in one direction of rotation only.

A "freewheeling bearing", whether of the rolling-contact type or cam type, is a device provided with at least one annular support body 21 inside which movable elements 22 are suitably constrained (distributed all over the circumferential extension), intended to dynamically connect the annular support body 21 to a first outer element (for example a shaft or bushed bearing) inserted inside the bearing 20 itself. Functionally the annular support body 21 of the bearing 20 is associated to a second external element, which moves in relation to the aforesaid first external element.

The movable elements 22 can couple the annular support body 21 to the aforesaid first external element (for example a shaft or a bushed bearing) directly or indirectly by interposition of a second annular body 23, concentric to the first, designed to be constrained to the aforesaid first external element.

Advantageously the freewheeling bearing of the rolling-contact type may be with balls, rollers or wedges.

In FIGS. 1 and 2 two freewheeling bearings of the rolling-contact type with rollers are shown.

More in detail, in FIG. 1 the bearing has an inner annular body 23 which forms a seat for the rollers with the support body 21 and is intended to be constrained to the element inserted in the bearing. The presence of the inner annular body 23, on the one hand increases the dimensions of the bearing, but on the other makes maintenance easier. In fact, thanks to the fact that the rollers are not in contact with the element inserted in the bearing (for example a shaft), during use they cannot score or spoil the said shaft due to construction defects or wear. In the event of failure of the bearing it will not therefore be necessary to replace the shaft too.

In FIG. 2 the rollers 22 are directly in contact with the element inserted in the bearing and are kept on the support body 21 by an annular body 24 provided with a slit for each roller. This type of freewheeling bearing is defined as "casing type". This structure on the one hand offers smaller dimensions, but on the other may make maintenance harder, there being the risk that in case of failure of the bearing the element inserted inside it may be damaged too.

Advantageously the cam type freewheeling bearing can be made in various ways, for example with a loop helical spring, with single springs, with double cages and loop spring (as illustrated in FIG. 3, where the single cams are indicated by number 25), or with single flexure springs.

The use of freewheeling bearings described above assures a number of advantages.

In the first place, as already specified above, the presence of moving bodies (roller or cam) ensures substantially uninterrupted rotation and, as a result, the possibility of interrupting motion in any position, something which is impossible (as already explained) in the case of a ratchet device.

This therefore allows extremely fine adjustment of the inclination of the movable part 3 of the arm-rest 1, as will be described in detail below, analysing some particular embodiments of the invention.

In the second place, thanks to the fact that the motion of the moving elements is not in steps but, in fact, uninterrupted, grating metallic noises can be avoided thus achieving an extremely silent system.

In addition, thanks to the fact that the movable elements are distributed all over the circumferential extension of the bearing, the blocking forces are distributed over a large number of points, ensuring a high degree of friction. This translates into improved solidity and safety of the system.

Lastly, given the possibility of using freewheeling bearings of the commercial type, and considering the simplifications which the use of such bearings produces in terms of manufacturing and assembly, the arm-rest 1 according to the invention results to be easy and economical to make.

Advantageously, the system for adjusting the arm-rest 1 according to the invention 1 comprises releasing means which act on the hinging means 10, 43, 53 and are able to liberate the rotation of the movable part 3 from the aforesaid raised position to the aforesaid lowered position.

Such releasing means may take various forms which will be described in more detail below, analysing some particular embodiments of the invention.

According to a first particular embodiment of the invention shown in FIGS. 4 to 8, the fixed part 2 of the arm-rest 1 is provided with two first bushes 4 aligned with each other. The movable part 3 is in turn provided with two second bushes 5, with apertures of different diameter.

In assembled state the first and second bushes 4 and 5 interface in pairs, aligning themselves along the rotation axis X, with the second bushes 5 positioned externally in relation to the first bushes 4.

As may be observed in particular in FIG. 5, the first bushes 4 define a cylindrical seat 6 (the function of which will explained below) by means of a circular cornice 9, closed on one side by a wall 7. In the centre of this wall 7 is a hole 8 for the insertion of the shaft 10.

The hinging means comprise a rotation shaft 10 having a main portion 11 and an extremal portion 12 with a widened cross-section. On the extremal portion with widened cross-section a freewheeling bearing 20 is provided of the rolling-contact type with casing (see FIGS. 2 and 7).

However other types of freewheeling bearings may be used, for example of the cam type or rolling-contact type without casing.

The main portion 11 of the shaft is calibrated to couple in rotation to the first bushes 4 of the fixed part 2 and to the second bush 5 of smaller cross-section. The freewheeling bearing 10 is inserted with interference in the second bush 5 of larger cross-section, bringing inside the extremal portion 12 with a widened cross-section of the shaft 10.

Functionally, the shaft 10 is connected in rotation to the fixed part 2 without any constraint and may therefore turn freely around the rotation axis X inside the first bushes 4. Also the movable part 3 is thus free to rotate around the axis X. In the upward movement the movable part 3 will turn on its own, while in the downward movement it will drag the shaft 10 in rotation with it thanks to the effect exerted on it by the freewheeling bearing 20.

The releasing means of the arm-rest are able to alternately assume a first operative position, in which they prevent rotation of the shaft 10 in relation to the fixed part 2, and a second operative position in which they let the shaft 10 free to rotate in relation to the fixed part 2.

When the releasing means are in the first operative position, the rotation of the movable part 3 may only occur in the direction allowed by the freewheeling bearing 20. When the releasing means are in the second operative position the rotation of the movable part 3 may occur in both directions, as has already been described above.

More specifically, again with reference to the aforesaid first embodiment of the invention, the releasing means comprise a toothed annular portion 30 made on the main portion 11 of the shaft 10, in a distal position in relation to the extremal portion 12. Such toothed portion 30 is positioned inside the cylindrical seat 6 defined by the first bush 4 of the fixed part 2 in a distal position in relation to the freewheeling bearing 20.

Figure 8:
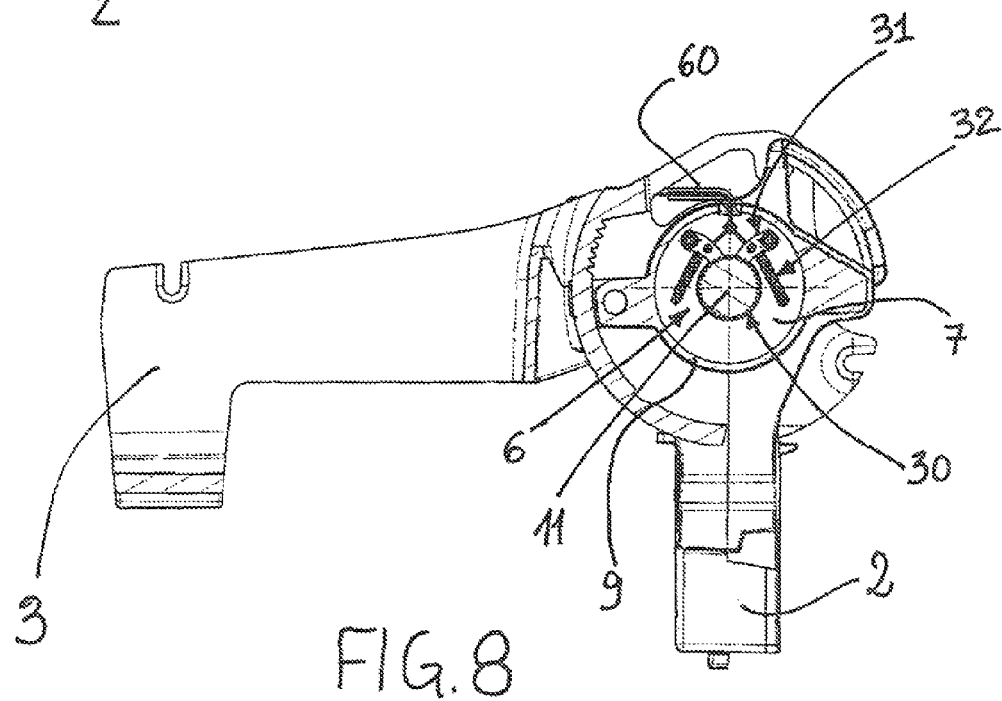
Figure 9:
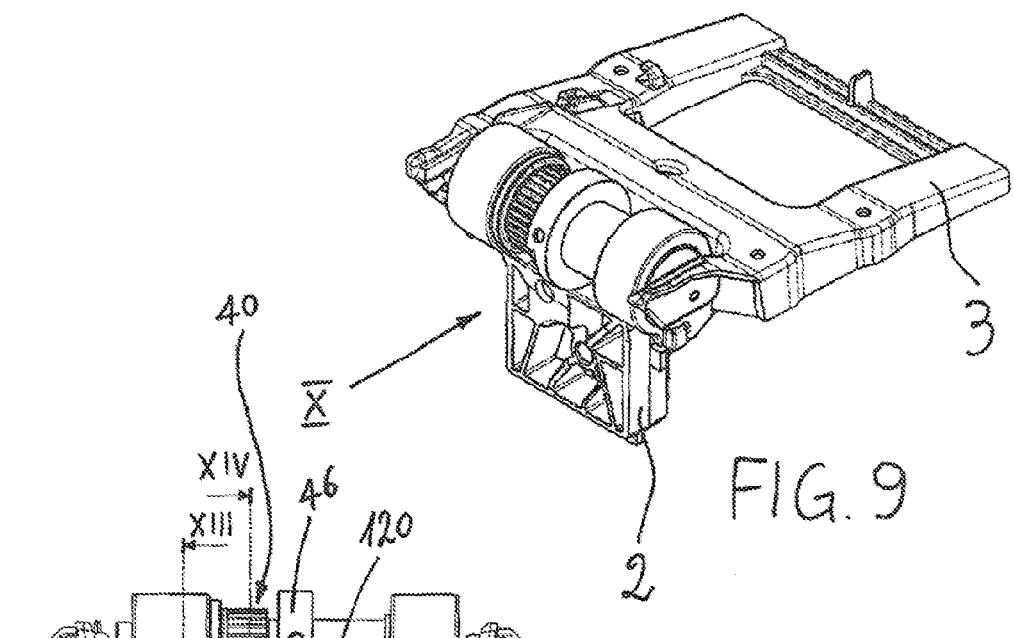
FIG. 9 shows a perspective view of an adjustable arm-rest made according to a third embodiment of the invention and represented with the movable part in the position of minimum inclination.
Figure 10:
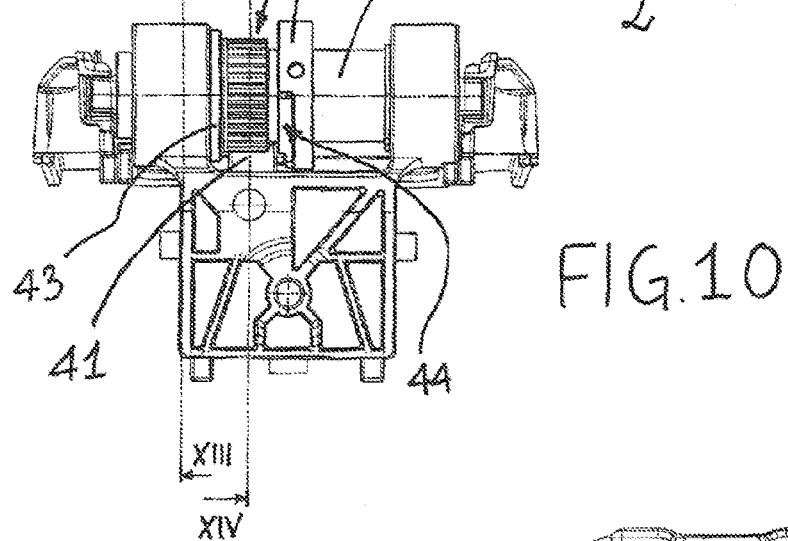
FIG. 10 shows a front view of the adjustable arm-rest illustrated in FIG. 9 according to the arrow X shown therein.
Figure 11:
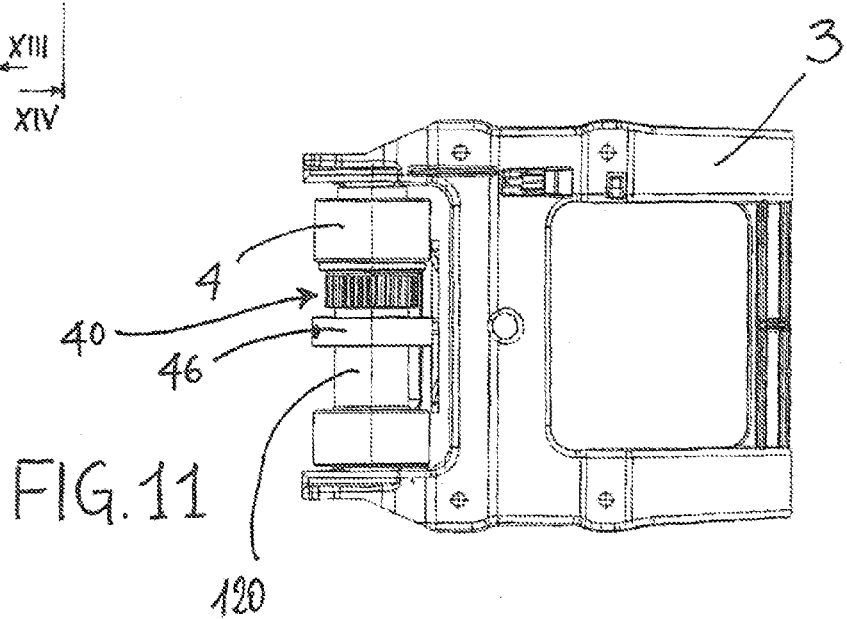
FIG. 11 shows a view from above of the adjustable arm-rest illustrated in FIG. 9.
Figure 12:
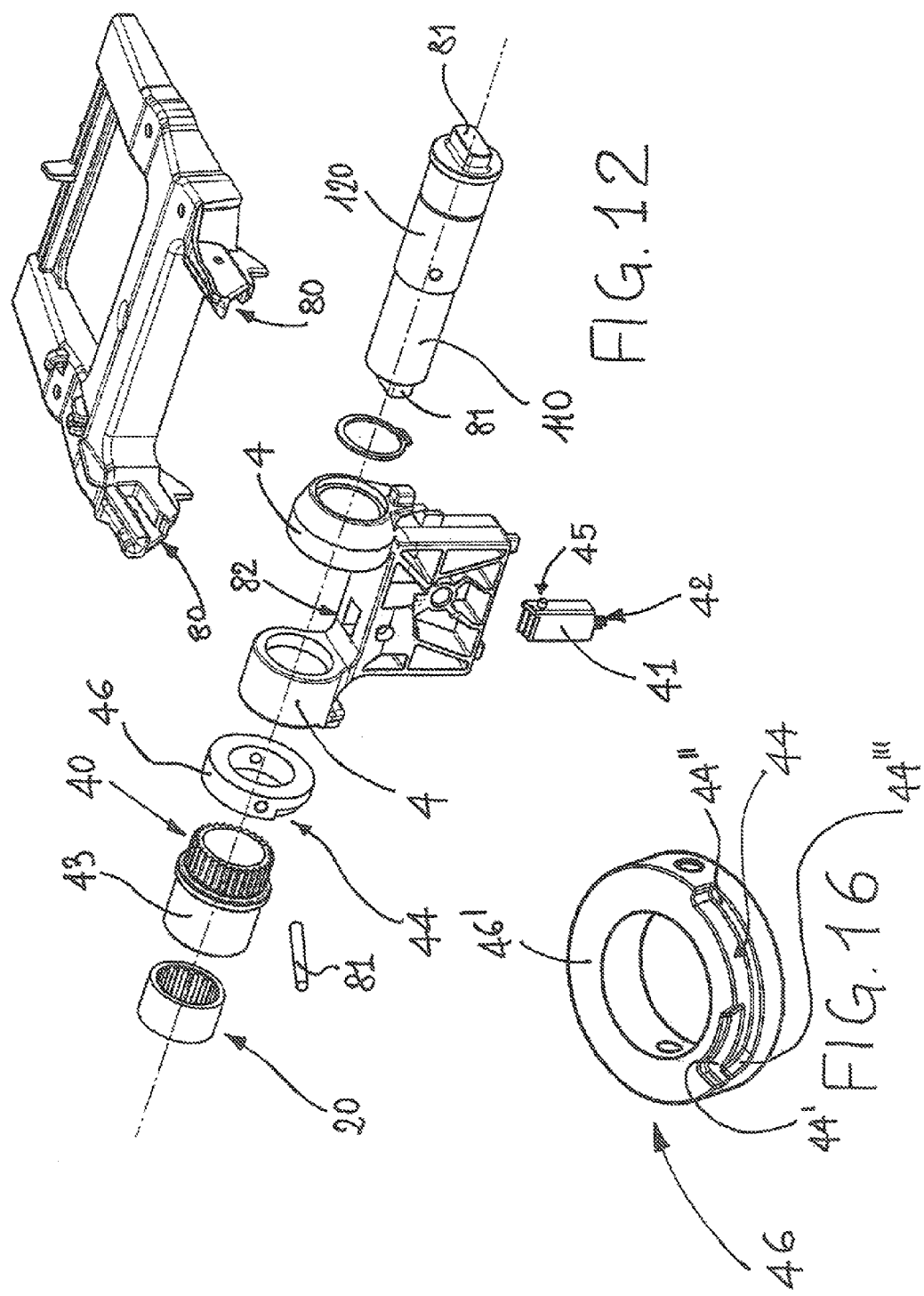
FIG. 12 shows an exploded view of the adjustable arm-rest illustrated in FIG. 9.
Figure 13:
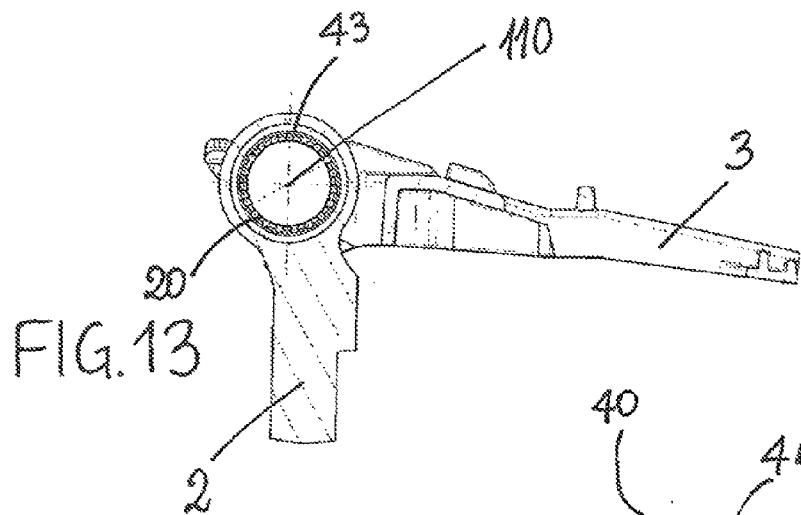
FIGS. 13 and 14 show two cross-section views of the adjustable arm-rest illustrated in FIG. 10 respectively according to the lines XIII-XIII and XIV-XIV shown therein.

The releasing means comprise, in addition, two toothed movable pawls 31, pivoting on the fixed part 2 of the arm-rest 1 and positioned inside the cylindrical seat 6 in which the toothed annular portion 30 of the shaft 10 is positioned. The two pawls 31 are positioned laterally on the shaft 10 in opposite positions so as to act on the latter like a vice and are kept engaged to the toothed portion 30 by elastic means 32, as shown in FIG. 8.

The releasing means comprise a manually operated mechanism 60 for moving the two pawls 31. The mechanism is framed so as to bring the pawls 31 from the aforesaid first operative position to the second operative position.

More specifically, the mechanism foresees one or more cables of the Bowden type 60 connected at a first extremity to the pawls 31 and at the second extremity to a control lever (not shown) made on the arm-rest and accessible to the user. By activating the lever the pawls 31 are moved, disengaging them from the toothed part 30, in contrast with the elastic means 32.

The releasing means just described make it possible to liberate the downward movement of the movable part 3 whatever position it finds itself in.

According to a second embodiment of the invention shown in FIGS. 17 to 22, similarly to the first embodiment, the fixed part 2 of the arm-rest 1 is provided with two first bushes 4 aligned with each other. The movable part 3 is provided in turn with two second bushes 5, with apertures of different diameters.

In assembled state the first and second bushes 4 and 5 interface in pairs, aligning themselves along the rotation axis X, with the second bushes 5 positioned externally in relation to the first bushes 4.

As can be seen in particular in FIGS. 18a and 18b, unlike the first embodiment, only the first bush 4, which is intended to sit next to the bearing 20, defines a cylindrical seat 6 closed by the cylindrical cornice 9. The other first bush 4 is defined on the contrary by a wall 7' (in which the hole 8 for insertion of the shaft 10 is made) which has on its outer side a boss 70 able to lie flat on the corresponding second bush 5 of the movable part 3. In this way, between the first and second bushes 4 and 5 an open cavity 71 is created making the mouth of the hole 8 accessible from outside. The function of this cavity 71 will be explained shortly.

The hinging means are exactly the same as those foreseen in the first embodiment. The shaft 10 has provided to the extremal portion 12 a freewheeling bearing 20 of the rolling-contact type, with casing (see FIGS. 2 and 20).

Other types of freewheeling bearings may be used however, for example of the cam type or rolling-contact type without casing.

The movements of the movable part 3 and of the shaft 10 are the same as those foreseen in the first embodiment.

The releasing means foreseen in this second embodiment do not require direct manual operation by a user, but are automatically activated by the movement of the movable part 3 itself of the arm-rest 1, as will be clarified further on in the description. On the one hand this simplifies the action of the user, but on the other does not allow liberating the downward movement of the movable part 3 in whatever position it is in. In fact this way the movable part needs to be raised first in order to liberate the downward movement.

Functionally, in the same way as foreseen in the first embodiment, the releasing means are able to alternately assume a first operative position, wherein they prevent rotation of the shaft 10 in relation to the fixed part 2, and a second operative position wherein they let the shaft 10 free to rotate in relation to the fixed part 2.

When the releasing means are in the first operative position the rotation of the movable part 3 can only occur in the direction permitted by the freewheeling bearing 20. When, however, the releasing means are in the second operative position the rotation of the movable part 3 can occur in both directions, as already described above.

More specifically, continuing to refer to the second embodiment of the invention, the releasing means comprise (as foreseen in the first embodiment) a toothed annular portion 30 made on the main portion 11 of the shaft 10, in a distal position in relation to the extremal portion 12. When assembled, the toothed portion 30 is positioned inside the aforesaid cavity 71.

Figure 21:
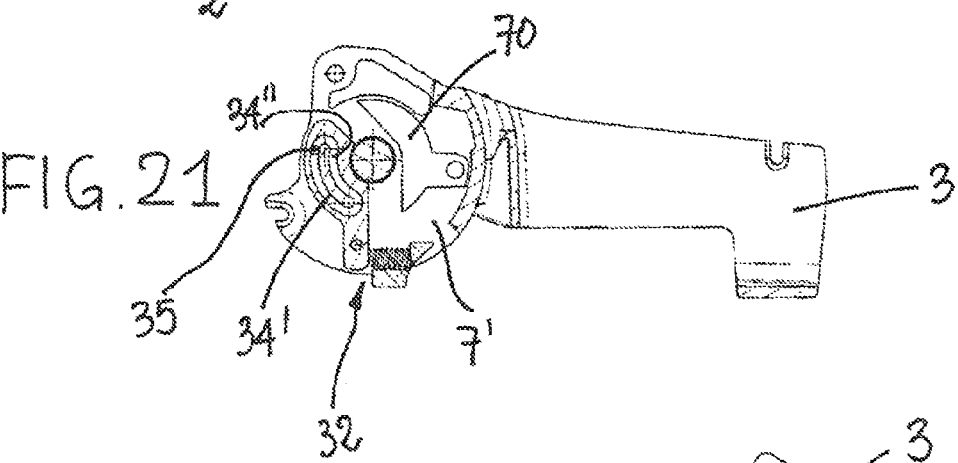

Unlike the first embodiment however, the releasing means comprise a movable toothed pawl 31, which is hinged to the fixed part 2 of the arm-rest 1 (so as to be able to rotate inside the aforesaid cavity 71 parallel to the wall 7') and is kept engaged to the toothed portion 30 by elastic means 32, as shown in FIG. 21.

Figure 22:
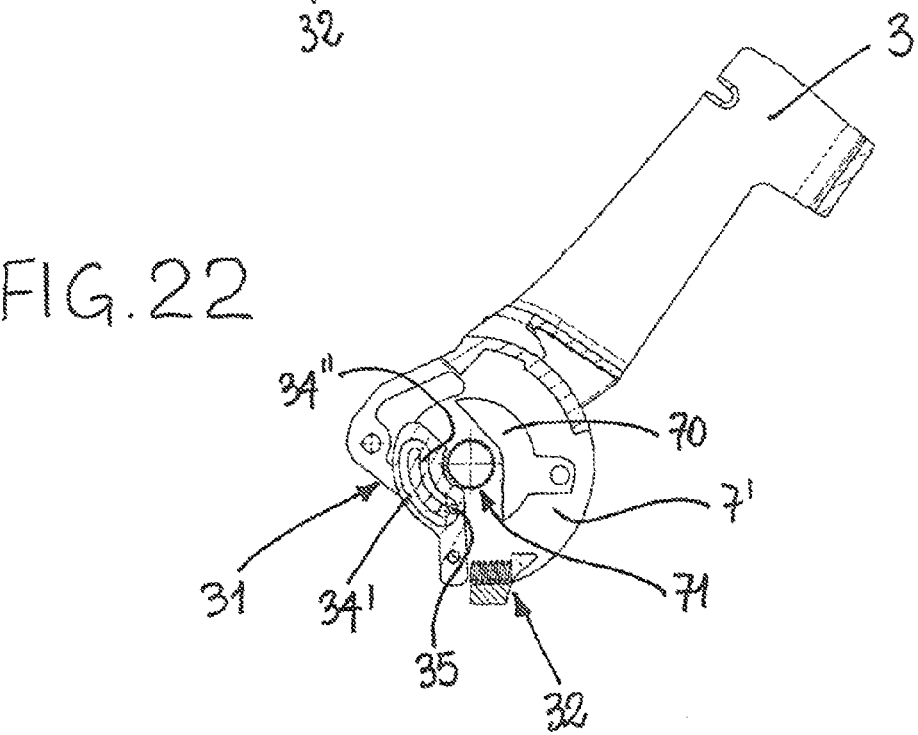
FIG. 22 shows a cross-section view of the adjustable arm-rest illustrated in FIG. 19 according to the line XXI-XXI shown therein, but represented with the movable part in the released position.
Figure 23:
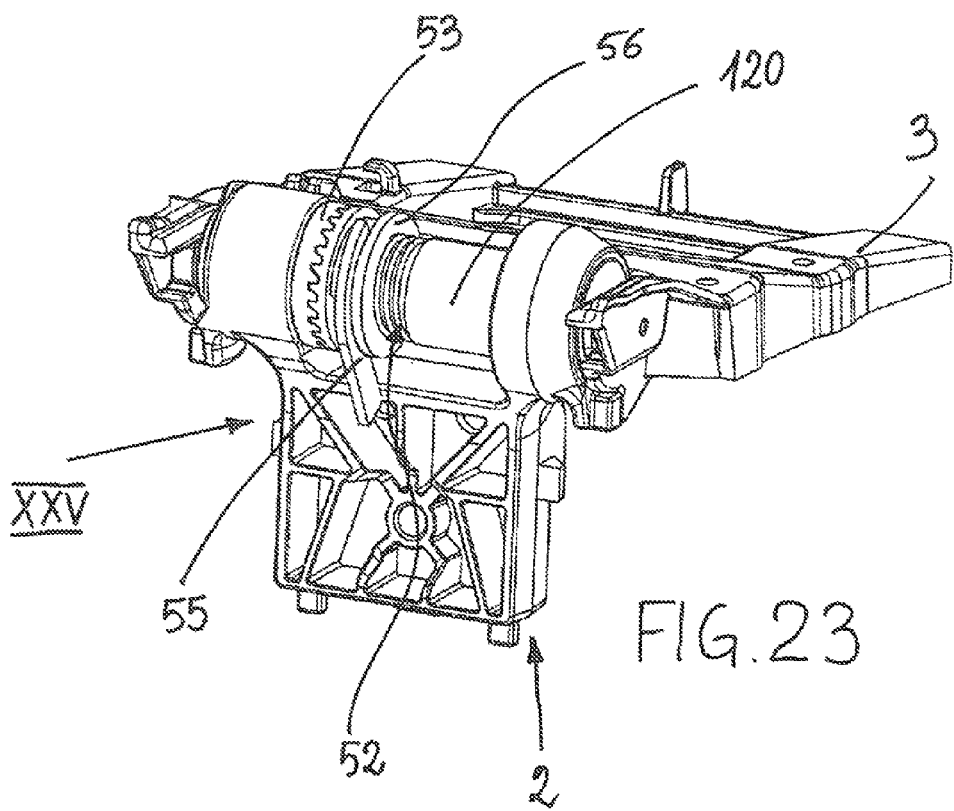
FIG. 23 shows a perspective view of an adjustable arm-rest made according to a fourth embodiment of the invention and represented with the movable part in the position of minimum inclination.
Figure 24:
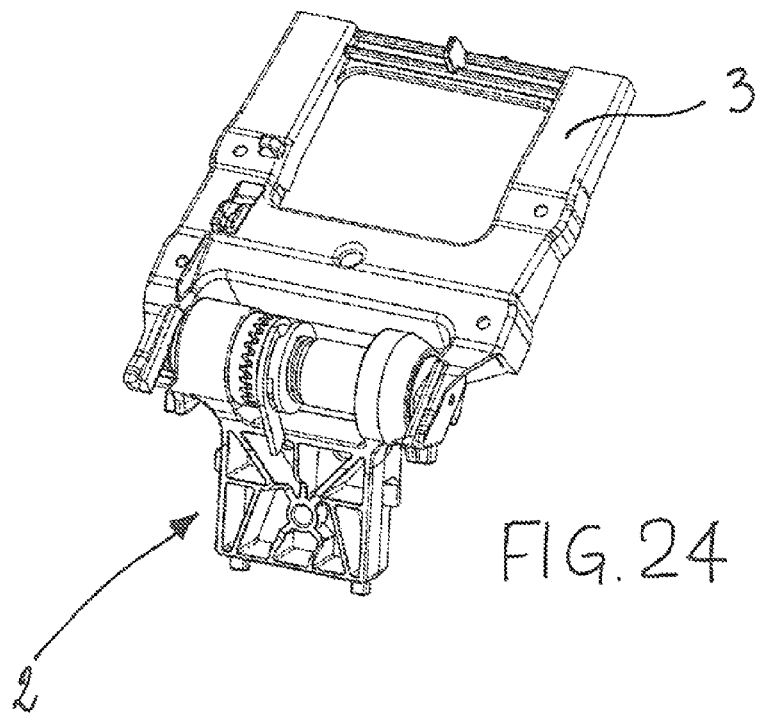
FIG. 24 shows a perspective view of the adjustable arm-rest illustrated in FIG. 23, represented with the movable part in the released position.
Figure 25:
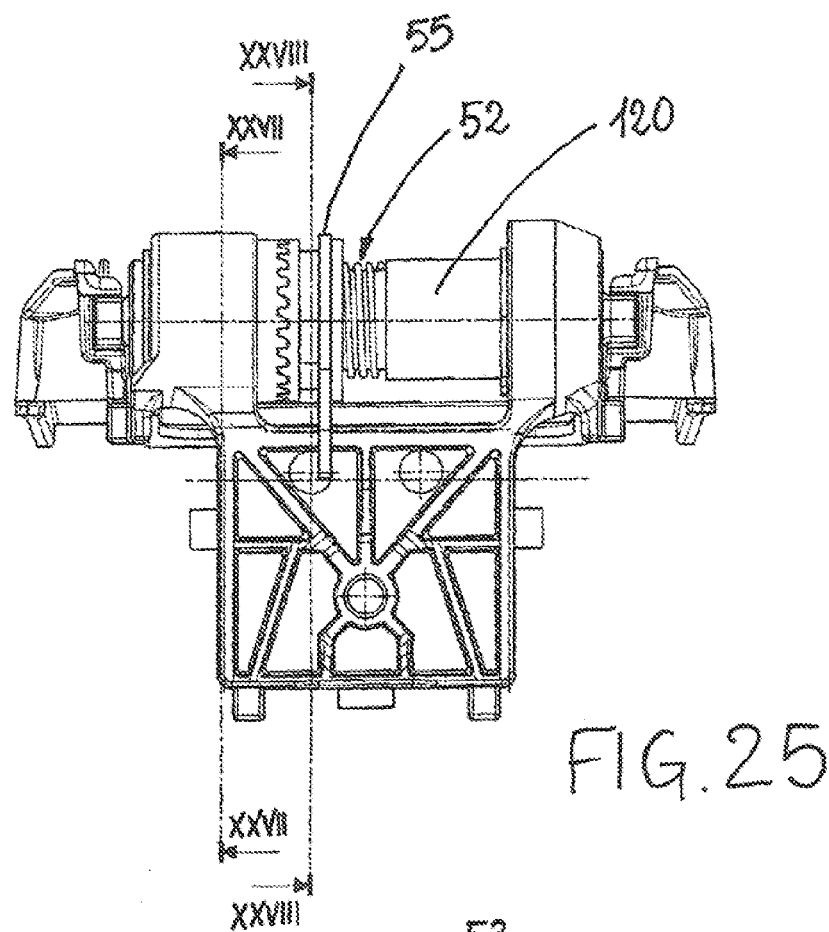
FIG. 25 shows a front view of the adjustable arm-rest illustrated in FIG. 23 according to the arrow XXV shown therein.
Figure 26:
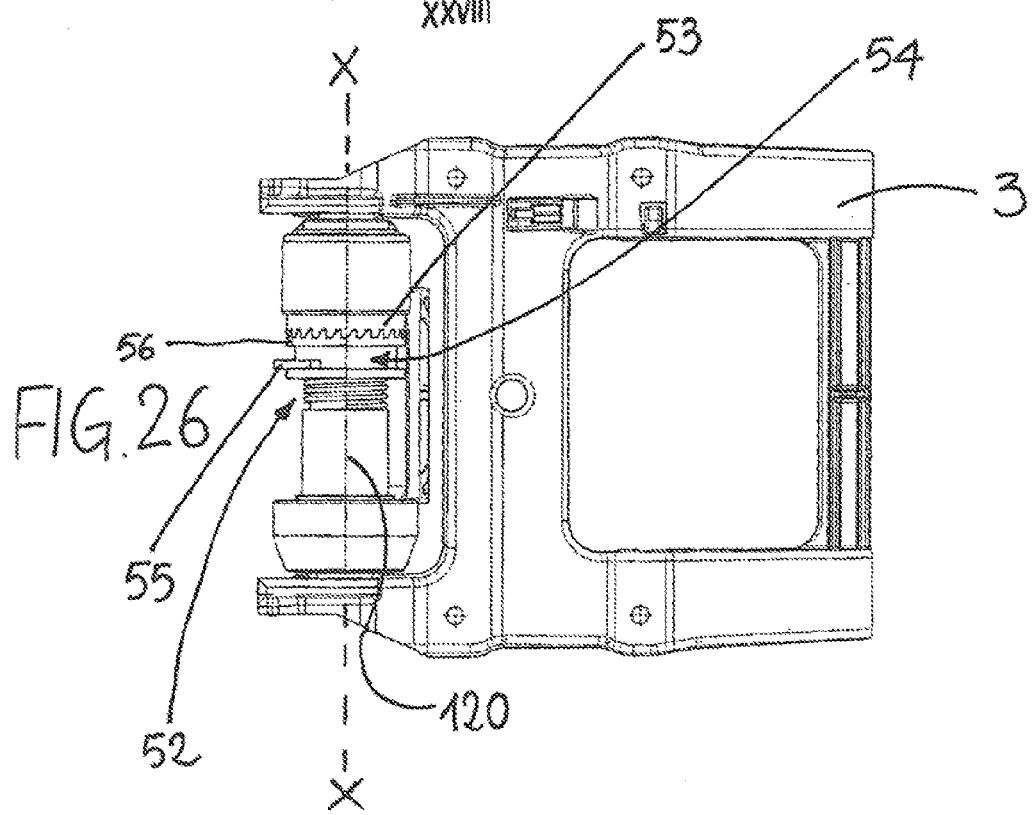
FIG. 26 shows a view from above of the adjustable arm-rest illustrated in FIG. 23.

As may be seen in particular in FIGS. 18a, 21 and 22, the movable pawl 31 has a cam portion 34. The cam portion 34 is engaged by a portion 35 protruding from the movable part 3 in correspondence of the second bush 5 of a smaller diameter.

More in detail, with reference in particular to FIGS. 21 and 22, the cam 34 is notched in the thickness of the pawl 31 and is defined as a closed circuit, comprised of two concentric curvilinear sections, of which a first section 34' with a radius of greater curvature and a second section 34" with a radius of lesser curvature, connected by two curves.

Functionally, the closed circuit of the cam 34 is shaped so that:

when the movable part 3 reaches and/or passes beyond the raised position, the protruding portion 35 (engaged in the cam 34) acts on the pawl 31 in contrast with the elastic means 32 disengaging it from the toothed portion 30 of the shaft 10.

when the movable part 3 moves in rotation from the lowered position to the raised position, the protruding portion 35 (still engaged in the cam) does not act in contrast with the elastic means 32, allowing the pawl 31 to engage the toothed portion 30.

More in detail, considering that with the movement of the movable part the protruding portion 35 turns around the axis X keeping itself constantly at the same distance, when the protruding portion moves inside the first section 34' of the cam, the pawl 31 remains engaged to the toothed portion 30 preventing rotation of the shaft 10 around the axis X (see FIG. 21). The shape of the pawl, as well as the relative positions of the first section 34' of the cam and of the protruding portion 35 are chosen so that the pawl 31, thrust by the elastic means 32, can stably engage the toothed portion 30 of the shaft 10.

Diversely, when the protruding portion enters the second section 34" of the cam, the pawl 31 is distanced from the toothed portion 30, in contrast with the elastic means 32, thus leaving the shaft 10 free to rotate around the axis X (see FIG. 22).

According to an embodiment not shown in the figures, in the arm-rest 1 described with reference to the second embodiment, a manually operated system for adjusting the inclination can be provided, able to act directly on the aforesaid movable pawl 31 (in contrast with the elastic means 32), so that the movable part 3 can be adjusted in whatever position it is. This manually operated system could be for example similar to that described above in relation to the first embodiment of the present invention.

According to a third particular embodiment of the invention, shown in FIGS. 9 to 15, the fixed part 2 of the arm-rest 1 has two bushes 4 aligned to each other. The movable part 3 has two seats 80, of square shape.

When assembled, the bushes 4 and the seats 80 interface in pairs, aligning themselves along the rotation axis X, with the seats 80 positioned externally in relation to the bushes 4.

The hinging means comprise a rotation shaft 10 provided at each extremity with a boss 81 intended to engage with interference inside the seats 80 made in the movable part 3. The shaft has a first portion 110 and a second portion 120 with a larger diameter.

The hinging means also comprise a bush 43 which is inserted rotationally inside one of the two bushes 4 of the fixed part 2 so as to be able to rotate freely around the axis X.

Inside the bush 43 a freewheeling bearing 20 of the rolling-contact casing type (see FIGS. 2 and 13) is engaged with interference.

However other types of freewheeling bearings can also be used, in particular of the cam type, and even of the rolling-contact type without casing, although this will entail construction difficulties due to the larger dimensions.

The shaft 10 is inserted with the first portion 110 inside the bearing 20 and with the second portion 120 inside the bush 4 not occupied by the bush 43. At the second portion 120, an annular body 46, the function of which will be explained later, is inserted and concentrically joined to the shaft 10 (for example by means of a pin 81.)

Functionally, the shaft 10 is connected in rotation to the fixed part 2 without any constraint and can therefore rotate freely around the rotation axis X inside the bushes 4. The movable part 3, which is joined to the shaft 10, is therefore also free to rotate around the axis X. In the upward movement the movable part 3 will rotate dragging the shaft 10 and the annular body 46, while in the downward movement it will drag the freewheeling bearing 20 and the bush 43 too, when rotating.

The releasing means foreseen in this third embodiment (similar to those foreseen in the second embodiment described above) do not require direct manual activation by the user, since they are automatically activated by the movements of the movable part 3 of the arm-rest 1, as will be explained further on. On the one hand this simplifies the action of the user, but on the other does not allow liberating the downward movement of the movable part 3 in whatever position it is. In fact in this way the movable part needs to be raised first in order to liberate the downward movement.

The releasing means are able to alternately assume a first operative position, in which they prevent the freewheeling bearing 20 (acting on the bush 43 as will be explained shortly) from rotating around the rotation axis X in relation to the fixed part 2 of the arm-rest, and a second operative position, in which they let the bearing 20 free to turn in relation to the fixed part 2.

When the releasing means are in the first operative position the rotation of the movable part 3 can only occur in the direction permitted by the freewheeling bearing 20, given that the shaft 10 (joined to the movable part 3) is rotationally inserted in the bearing 20. When the releasing means are in the second operative position the rotation of the movable part 3 can be in both directions, as already described above.

More in detail, continuing to refer to the aforesaid third embodiment of the invention, the releasing means comprise a toothed, annular portion 40 made concentrically on the bush 43. The toothed annular portion 40 is positioned between the two bushes 4 and faces the annular body 46 joined to the shaft 10.

The blocking devices also comprise a movable pawl 41, inserted so as to slide inside a suitable seat 82 made in the fixed part 2 between the two bushes 4, extending substantially orthogonal to the rotation axis X.

Figure 14:
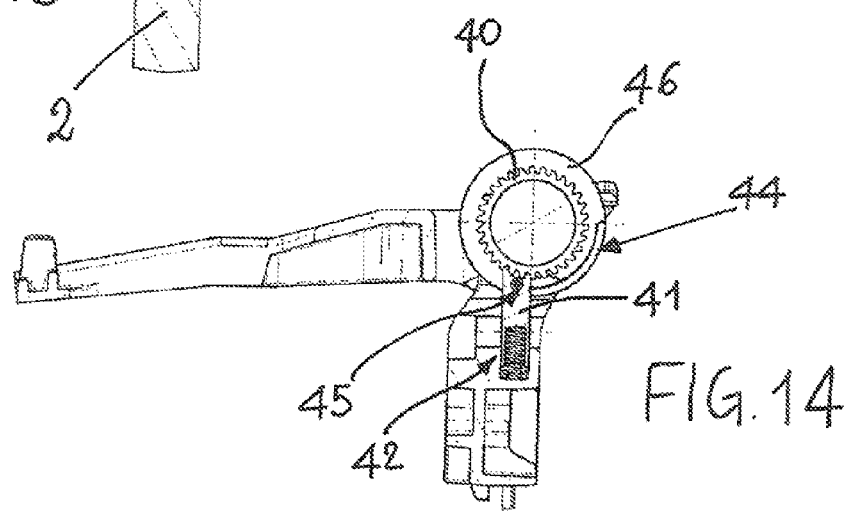

As may be observed in particular in FIG. 14, the movable pawl 41 is kept engaged to the toothed portion 40 of the bush 43 by elastic means 42.

The blocking devices comprise a portion 45 protruding from the movable pawl 41 and a cam element 44 made on an annular body 46. Operatively, the protruding portion 45 is able to engage the aforesaid element to the cam 44.

More in detail, the protruding portion 45 is composed of a pin, housed so as to slide in a suitable seat made on the movable pawl 41 and elastically pressed outwards. The pin is substantially parallel to the rotation axis and is therefore orthogonal to the direction of movement of the pawl 41.

Figure 15:
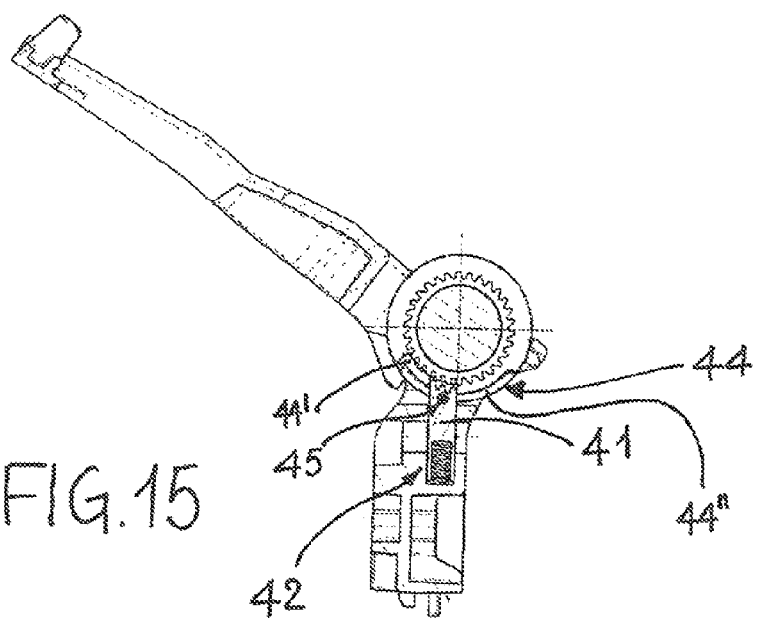
FIG. 15 shows a cross-section view of the adjustable arm-rest illustrated in FIG. 10 according to the line XIV-XIV shown therein, but represented with the movable part in the released position.
Figure 17:
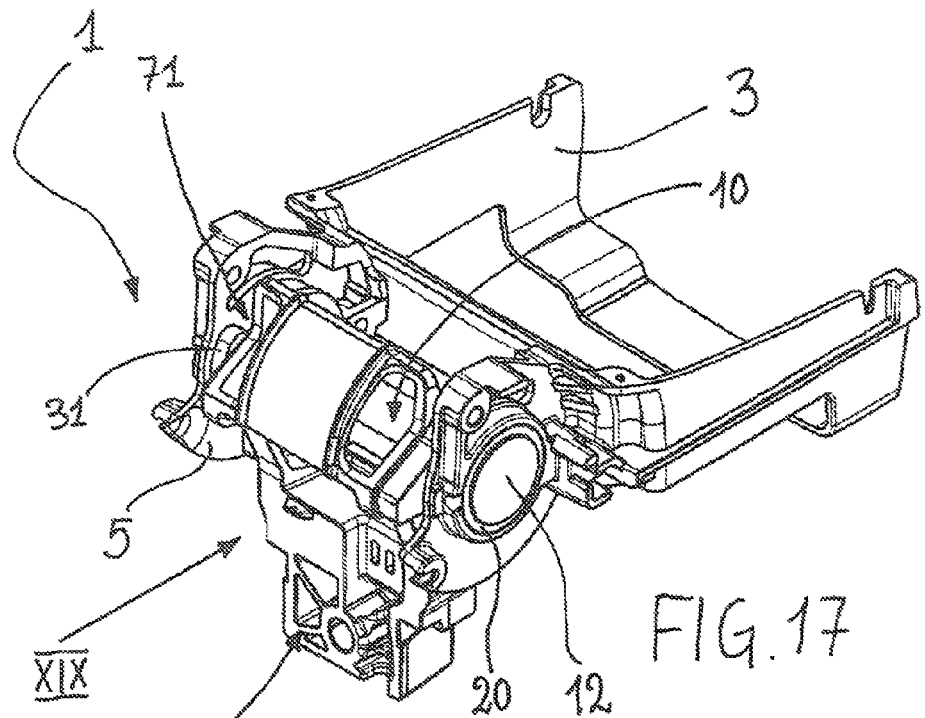
FIG. 17 shows a perspective view of an adjustable arm-rest made according to a second embodiment of the invention and represented with the movable part in the position of minimum inclination.
Figure 19:
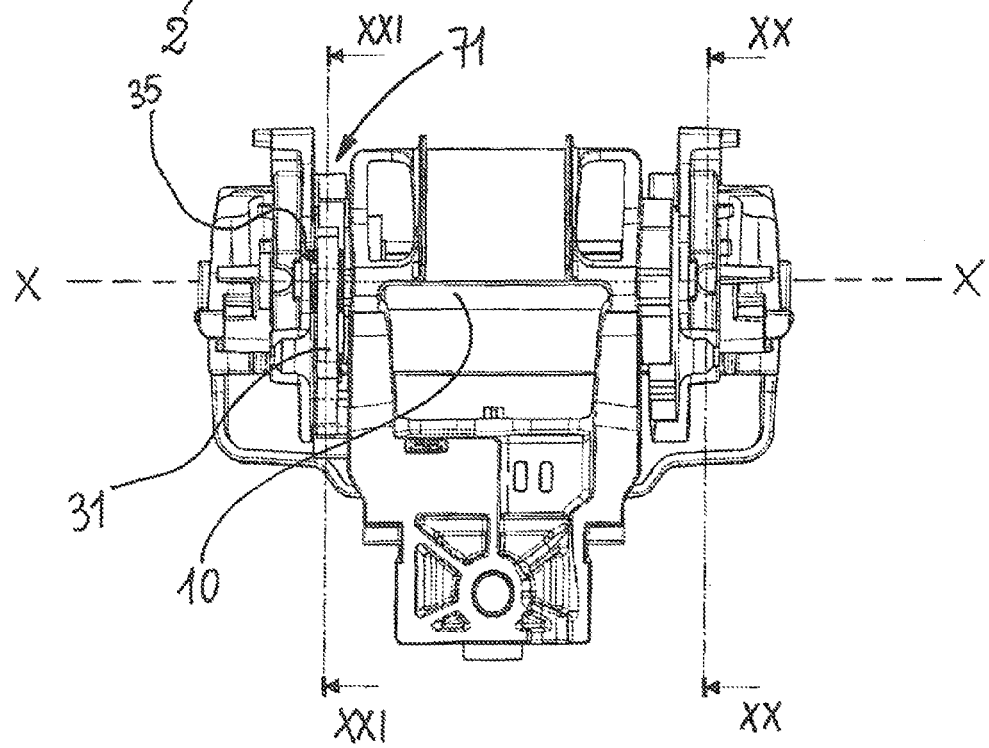
FIG. 19 shows a front view of the adjustable arm-rest illustrated in FIG. 17 according to the arrow XIX shown therein.
Figure 20:
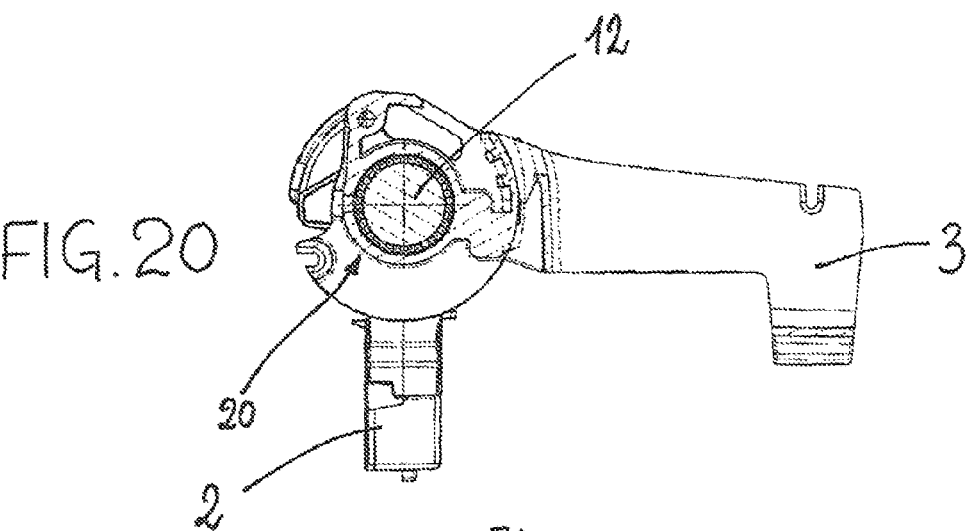
FIGS. 20 and 21 show two cross-section views of the adjustable arm-rest illustrated in FIG. 19 respectively according to the lines XX-XX and XXI-XXI shown therein.

With reference in particular to FIGS. 14, 15 and 16, the cam element 44 is notched in the thickness of the annular body 46 in correspondence of the crown-shaped, surface portion 46' facing the toothed portion 40 of the bush 43.

As may be observed in particular in FIG. 16, the cam element 44 is defined as a circuit at multiple levels, comprising two track sections at different depths in relation to the surface portion 46', of which a first shallower section 44' with a lesser curvature radius and a second deeper section 44" with a greater curvature radius, connected to each other by a ramp 44'''.

Functionally, the circuit of the cam element 44 is shaped so that:

when the movable part 3 reaches and/or passes beyond the aforesaid raised position, the cam element 44 acts on the pawl 41 at the protruding portion 45 in contrast with the elastic means 42, disengaging the pawl 41 from the toothed portion 40 of the bush 43; and when the movable part 3 moves in rotation from the aforesaid lowered position to the aforesaid raised position, the cam element 44 does not act against the elastic means 42, allowing the pawl 41 to engage the toothed portion 40 of the bush 43.

More in detail, when the protruding portion 45 moves inside the first section 44' of the cam element 44, the pawl 41 remains engaged to the toothed portion 40 preventing the rotation of the bush 43 and of the freewheeling bearing joined to it (see FIG. 14).

The radial extension of the toothed portion 40 is such as to touch the first section 44'; the form of the pawl, the position of the pin 45, and the radial depth of the first section 44' are chosen so that the pawl 41, thrust by the elastic means 42, may stably engage the toothed portion 40 of the bush 43.

Diversely, when the pin 45 enters the second section 44" of the cam, the pawl 41 is distanced from the toothed portion 40 in contrast with the elastic means 32, thus leaving the bush 43 with the freewheeling bearing 20 joined to it, free to rotate around the axis X (see FIG. 15).

According to alternative embodiments of the invention not shown in the attached figures, the releasing means foreseen in the third embodiment just described are replaced with the releasing means described in the first or in the second embodiment. The toothed portion 40 made in the bush 43 of the third embodiment has, in fact, an analogous function to that of the toothed portion 30 made on the shaft 10 of the first and second embodiments. The releasing means of these first two embodiments may therefore be easily adapted to the arm-rest described in the third embodiment.

According to a fourth particular embodiment of the invention shown in FIGS. 23 to 31, similarly to the third embodiment, the fixed part 2 of the arm-rest 1 has two bushes 4 aligned with each other. The movable part 3 has two square-shaped seats 80.

When assembled the bushes 4 and the seats 80 interface in pairs, aligning themselves along the rotation axis X, with the seats 80 positioned externally in relation to the bushes 4.

The hinging means comprise a rotation shaft 10 similar to the one foreseen in the third embodiment. The shaft 10 has a first portion 110 and a second portion 120 with a larger diameter and is provided at each extremity with a boss 81 intended to engage with interference inside the seats 80 made in the movable part 3.

Figure 27:
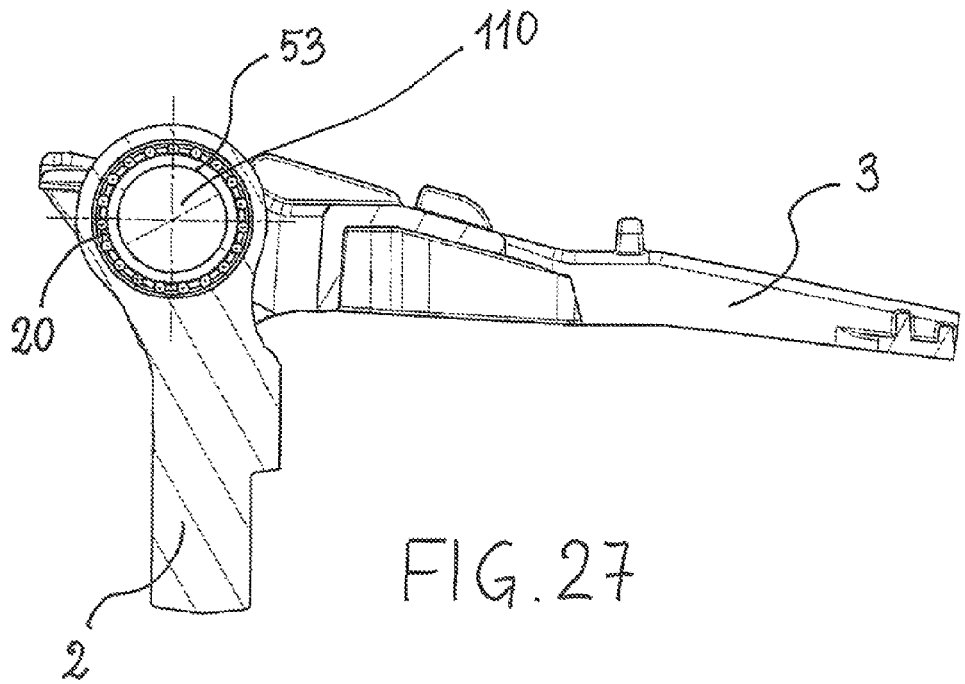
FIGS. 27 and 28 show two cross-sections of the adjustable arm-rest illustrated in FIG. 25 respectively according to the lines XXVII-XXVII and XXVIII-XXVIII shown therein.

Diversely from the third embodiment, the hinging means comprise a bush 53 which couples in rotation inside one of the two bushes 4 of the fixed part 2 thanks to a freewheeling bearing 20 of roller type, with casing (see FIGS. 2 and 27).

However other types of freewheeling bearing s can also be used, in particular of the cam type, and even of the rolling-contact type without casing, although this will entail construction difficulties due to the larger dimensions.

The bearing 20 is engaged with interference inside the bush 4. Consequently, the bush 53, inasmuch as connected in rotation to the bearing, can rotate around the axis X in relation to the bush 4, only in the direction allowed by the bearing.

The shaft 10 is inserted with the first portion 110 inside the bush 53 and with the second portion 120 inside the bush 4 not occupied by the bush 53 and by the bearing 20.

Functionally, the shaft 10 is connected in rotation to the fixed part 2 without any constraint and can therefore turn freely around the rotation axis X inside the bushes 4. The movable part 3, which is joined to the shaft 10, is therefore also free to rotate around the axis X.

Unlike the third embodiment of the invention, due to the opposite relative disposition of the bearing and bush and due to the free rotation existing between the bush 53 and the shaft 10, the movable part 3 will drag in rotation only the shaft 10 (and anything joined to it) both in its upward and downward movements.

The releasing means foreseen in this fourth embodiment (similar to those foreseen in the second and in the third embodiment described above) do not require manual activation by the user, since they are activated automatically by the movements of the movable part 3 of the arm-rest 1, as will be explained more clearly below. On the one hand this simplifies the action of the user, but on the other does not allow liberating the downward movement of the movable part 3 in whatever position it is. In fact in this way the movable part needs to be raised first in order to liberate the downward movement.

The releasing means of the arm-rest are able to alternately assume a first operative position, in which they prevent the shaft 10 from rotating around the rotation axis X inside the bush 53 (in the manner which will be described shortly, describing such means in detail) and a second operative position, in which they let the shaft 10 free to rotate around the rotation axis X inside the bush 53.

When the releasing means are in the first operative position the rotation of the movable part 3 can only occur in the direction permitted by the freewheeling bearing 20, given that the shaft 10 (joined to the movable part 3) is not free to rotate inside the bush 53 (as will be described shortly). When the releasing means are in the second operative position, the rotation of the movable part 3 can occur, on the contrary, in both directions, as already described above.

More in detail, continuing to refer to this fourth embodiment of the invention, the releasing means comprise an annular engagement body 56 which is inserted so as to slide and joined axially (in a fixed radial position) to the shaft 10 (for example, using a cross key 91) at the second portion 120. When assembled, the engagement body 56 is positioned between the two bushes 4 of the fixed part 2.

Figure 29:
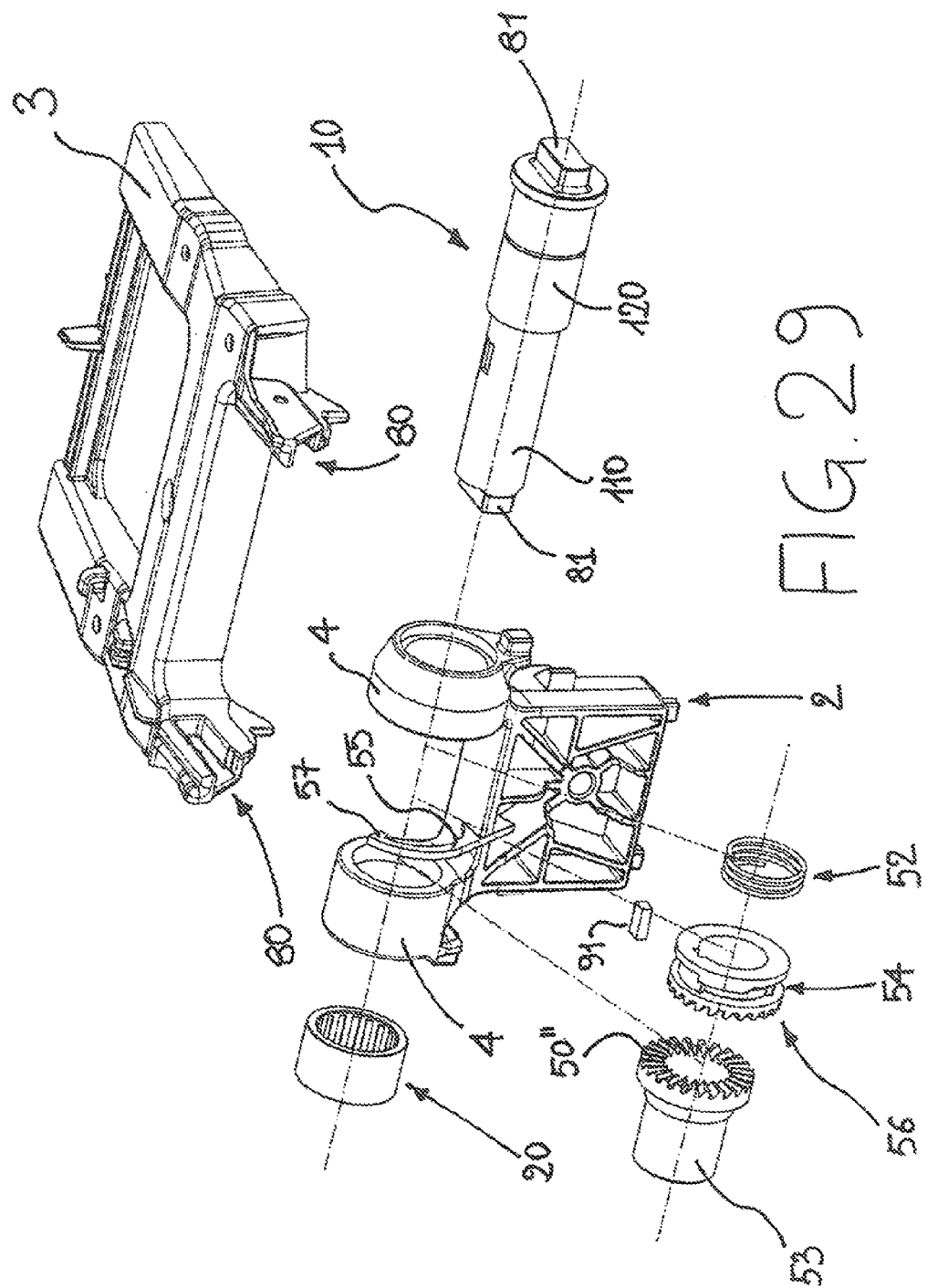
FIG. 29 shows an exploded view of the adjustable arm-rest illustrated in FIG. 23.
Figure 30:
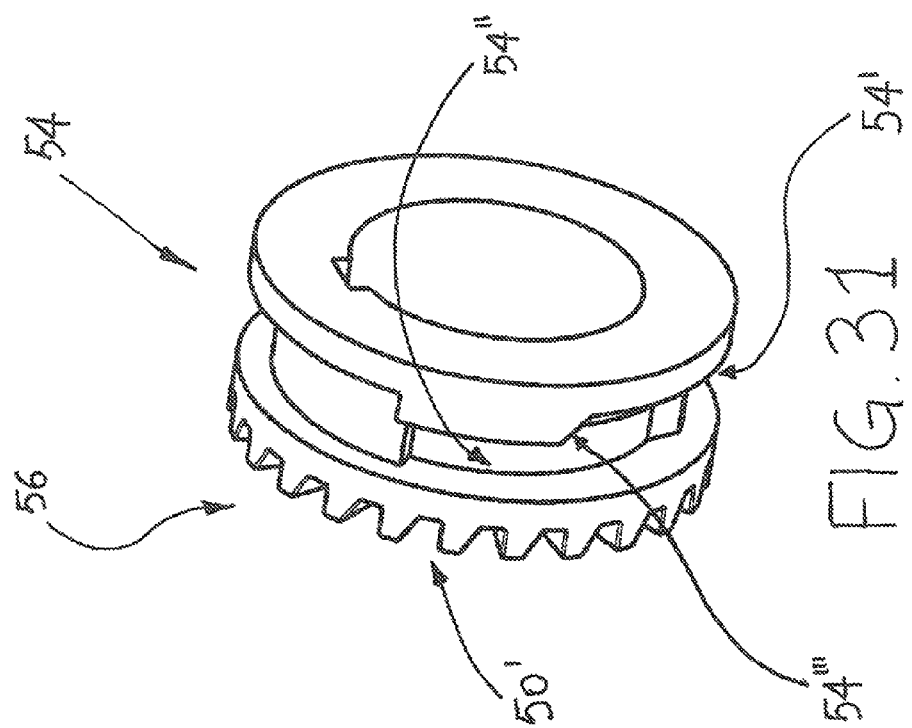
FIGS. 30 and 31 show two different perspective views of a detail of the adjustable arm-rest illustrated in FIG. 29 relative to a toothed annular body with cam.
Figure 31:
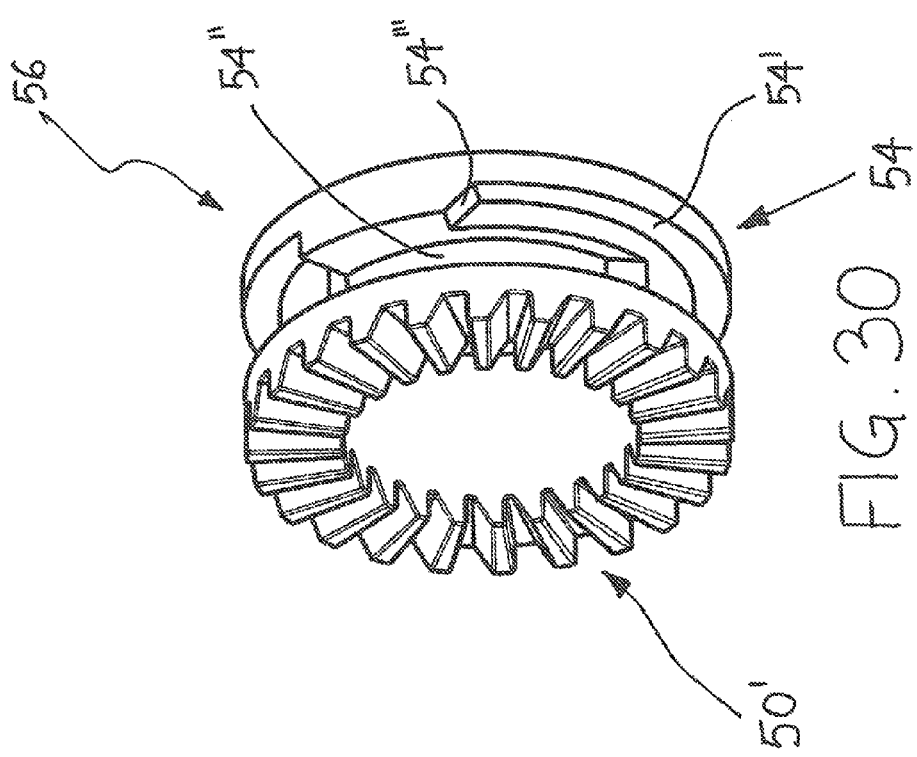
Figure 32:
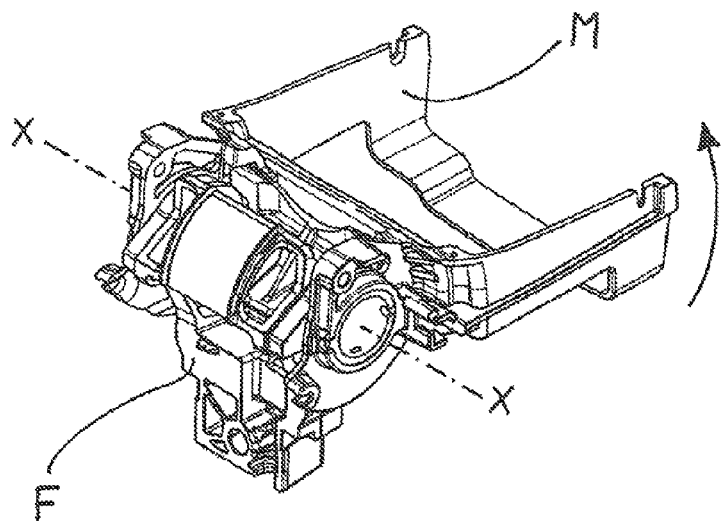
FIGS. 32-34 show a traditional adjustable arm rest.
Figure 33:
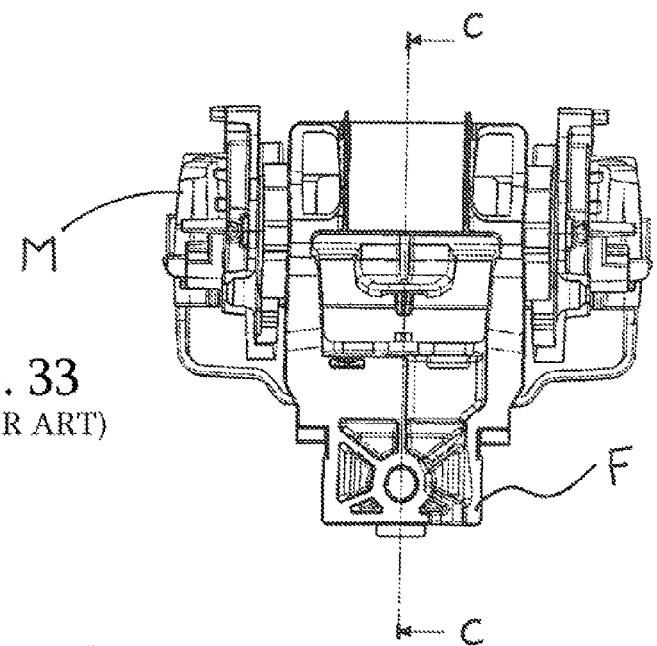
Figure 34:
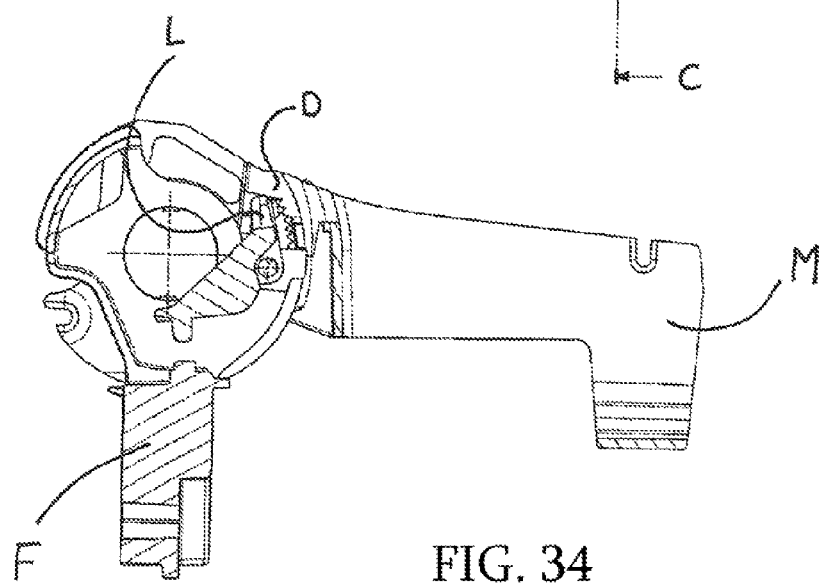

As may be observed in particular in FIGS. 29, 30 and 31, on the annular body 53, in correspondence of the crown-shaped base facing the bush bearing 53, a first toothed portion 50' is made. On the outermost lateral surface of the annular body 56 a cam portion 54 is made, the function of which will be explained shortly.

The releasing means comprise a second toothed portion 50" made on the bush 53, in correspondence of the crown-shaped base facing the annular engagement body 56.

Functionally, the annular engagement body 56 is kept engaged in rotation to the bush 53 by elastic means 52 so that the two toothed portions 50' and 50" mesh with each other. The elastic means 52 are provided concentrically on the first portion 110 of the shaft 10 and press against the shoulder defined by the second portion 120 of the shaft 10.

The releasing means comprise, in addition, a protruding portion 55, hinged (by means of a pin 58) to the fixed part 2 of the arm-rest between the two bushes 4 and provided at its free extremity with a tooth 57. The protruding portion 55 is able to move on a plane orthogonally transversal to the rotation axis and is able to engage the cam portion 54 in a sliding manner with the tooth 57 made on the annular engagement body 56. The protruding portion 55 is kept engaged to the cam portion 54 of the engagement body 56 by elastic means (not shown in the figures) which tend to thrust the tooth 57 in rotation against the cam portion 54.

Figure 28:
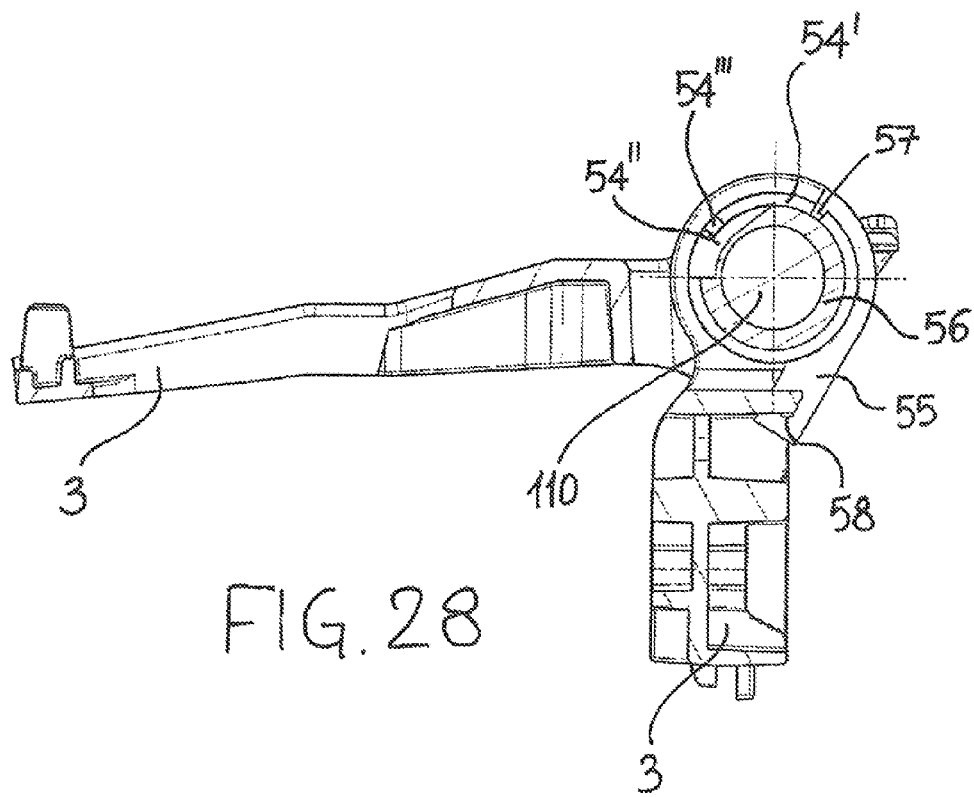

With reference in particular to FIGS. 28, 30 and 31, the cam element 54 is notched in the thickness of the annular body 56 and is defined as a circuit at multiple levels, comprising two track sections, at different depths in relation to the toothed portion 50', of which a first deeper section 54' and a second shallower section 54" connected to each other by a ramp 54'''.

Functionally, the cam portion 54 is shaped so that:

when the movable part 3 (to which the annular body 56 with the cam portion is joined in rotation by the shaft 10) reaches and/or passes beyond the raised position, the protruding portion 55 (which is instead joined to the fixed part 2) acts on the annular engagement body 56 against the elastic means 52, imposing on it an axial movement in a direction opposite to that in which the bush 53 is;

when the movable part 3 moves in rotation from the lowered position to the raised position, the protruding portion 55 does not act against the elastic means 52 allowing the annular engagement body 56 to engage the bush 53.

More in detail, when the tooth 57 of the protruding portion 55 is engaged in the first section 54' of the cam portion 54, the engagement body 56 (pressed by the elastic means 52) remains engaged by the first toothed portion 50' to the second toothed portion 50" of the bush 53. In this way the engagement body 56 and the shaft 10 joined to it are forced to rotate with the bush 53, that is only in the direction of rotation allowed by the freewheeling bearing (see FIGS. 27 and 28).

Diversely, when the tooth 57 of the protruding portion 55 engages in the second section 54" of the cam portion 54 going back up the ramp 54''', it applies an axial thrust to the engagement body 56 in contrast with the elastic means 52, thus distancing the engagement body 56 from the bush 53 and causing the disengagement of the two toothed portions 50' and 50". This derives from the fact that the protruding portion 54 has a fixed axial position, while the engagement body 56 is axially movable, and from the fact that the second section 54" is shallower than the first section 54' (in other words, the surface of the second section 54" is closer to the second toothed portion 50' than the surface of the first section 54'). In this way the engagement body 56 and the shaft 10 joined to it are free to rotate freely around the axis X in relation to the bush 53, that is in both directions.

According to an embodiment not shown in the attached figures, in the arm-rest 1 described with reference to the fourth embodiment, a manually operated system for adjusting the inclination may be foreseen, able to act directly on the aforesaid annular engagement body 56 (in contrast with the elastic means 52), so that the movable part 3 can be adjusted in whatever position it is. Such manually operated system may, for example, be similar to the one described above in relation to the first embodiment of the present invention. In this case the protruding portion 55 (foreseen in the fourth embodiment) would be eliminated, and the engagement body 56 would no longer have the aforesaid cam portion 54.

As hinted at above, the arm-rest 1 according to the invention may be adjusted in inclination much more precisely than the traditional adjustable arm-rests.

The adjustment of the arm-rest 1 is substantially silent, thus eliminating the intrinsic noise of the traditional arm-rests.

The arm-rest 1 is, in addition, mechanically more reliable and safer. In fact the toothed parts foreseen in the arm-rest according to the invention, unlike traditional arm-rests, are not subject to continuous rubbing causing wear. The toothed portions are not in fact directly involved in the adjustment of the movable part 3 in passing from the lowered position to the raised position.

Lastly, thanks to the possibility of using freewheeling bearings widely found on the market, and considering the simplifications which the use of such bearings entails, as regards production and assembly, the arm-rest 1 according to the invention proves easy and economical to make.

The invention so conceived therefore achieves the objectives set.

Obviously it may assume, in its practical embodiment, forms and configurations other than those shown while remaining within the scope of protection.

In addition, all the parts may be replaced by other technically, equivalent parts and the dimensions, shapes and materials used may be of any type, as required.

The invention claimed is:

1. An arm rest, adjustable in inclination, in particular for vehicles, comprising:
   a fixed part, intended to be connected to the frame of the vehicle;
   a movable part, hinged to said fixed part around a rotation axis X by a shaft aligned along said axis X to move between a lowered angular position and a raised angular position, and
   a system for adjusting the inclination of said movable part between said lowered position and said raised position;
   wherein said system for adjusting the inclination α comprises:
   at least one freewheeling bearing, chosen from those of rolling-contact type and those of cam type, associated to said shaft so as to allow said movable part to rotate around said axis X only in the direction of rotation which from said lowered position leads to said raised position; and
   releasing means, acting on said shaft and able to liberate the rotation of said movable part from said raised position to said lowered position, wherein said freewheeling bearing is joined to said fixed part and wherein said shaft is joined to said movable part and is connected in rotation to said freewheeling bearing inside a bush so as to be able to rotate freely around said axis X, said releasing means being able to alternately take a first operative position, in which they make said shaft rotate around said axis X together with said bush and a second operative position, in which they let said shaft free to rotate around said axis X.

2. An arm rest according to the claim 1, wherein said releasing means comprise an annular engagement body sliding axially on said shaft in a fixed radial position, said annular engagement body being held in rotational engagement to said bush by elastic means.

3. An arm rest according to claim 2, wherein said releasing means comprise at least one protruding portion connected to said fixed part and able to engage in a sliding manner a cam portion which is made on said annular engagement body and is shaped so that, when said movable part reaches and/or passes beyond said raised position, said protruding portion acts on said annular engagement body in contrast with said elastic means disengaging them from said bush.

4. An arm rest according to claim 3, wherein said cam portion is shaped so that when said movable part moves in rotation from said lowered position to said raised position, said protruding portion does not act in contrast with said elastic means letting said annular engagement body engage said bush.

* * * * *